United States Patent
Kishimoto et al.

(10) Patent No.: US 9,797,115 B2
(45) Date of Patent: *Oct. 24, 2017

(54) WORK VEHICLE, AND WORK VEHICLE CONTROL METHOD FOR CHARGING

(71) Applicant: KOMATSU LTD., Tokyo (JP)

(72) Inventors: Yasuki Kishimoto, Hiratsuka (JP); Hiroshi Monden, Hiratsuka (JP); Yasunori Ohkura, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 14/909,183

(22) PCT Filed: Jan. 20, 2015

(86) PCT No.: PCT/JP2015/051396
§ 371 (c)(1),
(2) Date: Feb. 1, 2016

(87) PCT Pub. No.: WO2015/115250
PCT Pub. Date: Aug. 6, 2015

(65) Prior Publication Data
US 2016/0160471 A1    Jun. 9, 2016

(30) Foreign Application Priority Data

Jan. 30, 2014  (JP) ................................ 2014-015942

(51) Int. Cl.
*E02F 9/20*  (2006.01)
*B60W 10/02*  (2006.01)
(Continued)

(52) U.S. Cl.
CPC ............ *E02F 9/2075* (2013.01); *B60K 6/365* (2013.01); *B60K 6/445* (2013.01); *B60W 10/02* (2013.01);
(Continued)

(58) Field of Classification Search
CPC ..... E02F 9/2079; E02F 9/2292; E02F 9/2296; E02F 9/2075; E02F 9/2091; B60W 10/06;
(Continued)

(56) References Cited

U.S. PATENT DOCUMENTS 5,904,631 A    5/1999  Morisawa et al.
2001/0056544 A1*  12/2001  Walker .................... B60R 25/02
                                                          726/2
(Continued)

FOREIGN PATENT DOCUMENTS

JP    10-58990 A    3/1998
JP    2000-219052 A    8/2000
(Continued)

OTHER PUBLICATIONS

The International Search Report for the corresponding international application No. PCT/JP2015/051396, dated Mar. 31, 2015.
(Continued)

*Primary Examiner* — Atul Trivedi
(74) *Attorney, Agent, or Firm* — Global IP Counselors, LLP

(57) ABSTRACT

A power transmission device includes an input shaft, an output shaft, a gear mechanism, an energy-generating motor, a first clutch, and a locking device. The energy storage unit is configured to store the energy generated by the energy-generating motor. The gear mechanism includes a planetary gear mechanism, which includes a first rotation element, a second rotation element, and a third rotation element, which are mutually different. The first clutch is provided in the power transmission route between the engine and the first rotation element. The locking device locks or releases the second rotation element. The energy-generating motor is connected to the third rotation element. A controller locks the second rotation element, converges the rotation speeds of
(Continued)

two rotation shafts in the first clutch to cause the first clutch to engage, and rotates the energy-generating motor using drive power from the engine to thereby accumulate energy in the energy storage unit.

13 Claims, 10 Drawing Sheets

(51) Int. Cl.
| | |
|---|---|
| *B60W 10/06* | (2006.01) |
| *B60W 10/08* | (2006.01) |
| *B60W 10/26* | (2006.01) |
| *B60W 20/13* | (2016.01) |
| *B60K 6/445* | (2007.10) |
| *B60K 6/365* | (2007.10) |
| *B60W 20/11* | (2016.01) |
| *E02F 9/22* | (2006.01) |
| *F16H 3/72* | (2006.01) |
| *F16H 37/10* | (2006.01) |

(52) U.S. Cl.
CPC ............ *B60W 10/06* (2013.01); *B60W 10/08* (2013.01); *B60W 10/26* (2013.01); *B60W 20/11* (2016.01); *B60W 20/13* (2016.01); *E02F 9/2079* (2013.01); *B60W 2300/17* (2013.01); *B60W 2510/244* (2013.01); *B60W 2710/021* (2013.01); *B60W 2710/0644* (2013.01); *B60W 2710/081* (2013.01); *B60W 2710/244* (2013.01); *E02F 9/2091* (2013.01); *E02F 9/2292* (2013.01); *E02F 9/2296* (2013.01); *F16H 3/728* (2013.01); *F16H 2037/101* (2013.01); *F16H 2200/2007* (2013.01); *F16H 2200/2041* (2013.01); *Y02T 10/6239* (2013.01); *Y02T 10/6286* (2013.01); *Y10S 903/93* (2013.01)

(58) Field of Classification Search
CPC ...... B60W 10/26; B60W 10/08; B60W 10/02; B60W 2300/17; B60W 2510/244; B60W 20/11; B60W 20/13; B60W 2710/0644; B60W 2710/021; B60W 2710/244; B60W 2710/081; F16H 3/728; F16H 2037/101; F16H 2200/2007; F16H 2200/2041; B60K 6/445; B60K 6/365; Y02T 10/6286; Y02T 10/6239; Y10S 903/93
USPC ...................... 701/22; 180/65.265; 903/930
See application file for complete search history.

(56) References Cited

U.S. PATENT DOCUMENTS

| | | | |
|---|---|---|---|
| 2006/0214426 A1 | 9/2006 | Asao et al. | |
| 2007/0254764 A1 | 11/2007 | Shibata et al. | |
| 2008/0200296 A1 | 8/2008 | Holmes | |
| 2008/0234885 A1 | 9/2008 | Suzuki | |
| 2009/0105028 A1 | 4/2009 | Hiraki et al. | |
| 2009/0152029 A1 | 6/2009 | Matsubara et al. | |
| 2011/0092334 A1* | 4/2011 | Baino | B60K 6/387 477/5 |
| 2012/0004797 A1* | 1/2012 | Baino | B60K 6/48 701/22 |
| 2012/0108378 A1 | 5/2012 | Hiraki et al. | |
| 2012/0259524 A1* | 10/2012 | Miyazaki | B60W 50/10 701/70 |

FOREIGN PATENT DOCUMENTS

| | | |
|---|---|---|
| JP | 2005-237084 A | 9/2005 |
| JP | 2006-329244 A | 12/2006 |
| JP | 2007-290629 A | 11/2007 |
| JP | 2009-149133 A | 7/2009 |
| JP | 2013-203259 A | 10/2013 |
| WO | 2006/126368 A1 | 11/2006 |

OTHER PUBLICATIONS

The extended European search report for the corresponding European application No. 15743816.9, dated Feb. 28, 2017.

* cited by examiner

WORK VEHICLE, AND WORK VEHICLE CONTROL METHOD FOR CHARGING

CROSS-REFERENCE TO RELATED APPLICATIONS

This application is a U.S. National stage application of International Application No. PCT/JP2015/051396, filed on Jan. 20, 2015. This U.S. National stage application claims priority under 35 U.S.C. §119(a) to Japanese Patent Application No. 2014-015942, filed in Japan on Jan. 30, 2014, the entire contents of which are hereby incorporated herein by reference.

BACKGROUND

Field of the Invention

The present invention relates to a work vehicle and a work vehicle control method for charging.

Background Information

Work vehicles, such as wheel loaders, are known that are equipped with a power transmission device that includes a torque converter and a multi-speed transmission (hereafter referred to as a "torque converter transmission"). Recently, on the other hand, the hydraulic mechanical transmission (HMT) and the electro-mechanical transmission (EMT) have been replacing torque converter transmissions as power transmission devices.

As disclosed in Japanese Laid-Open Patent Application Publication No. 2006-329244, an HMT includes a gear mechanism and a motor connected to the rotational elements in the gear mechanism, where a portion of the drive power from the engine is converted to hydraulic pressure and transmitted to the travel apparatus while the remainder of the drive power is mechanically transmitted to the travel apparatus.

An EMT is provided with a planetary gear mechanism and an electric motor, for instance, to allow for continuously variable shifting. One of three elements, i.e., the sun gear, the carrier, or the ring gear in the planetary gear mechanism, is connected to an input shaft, and a second element is connected to an output shaft. Additionally, a third element is connected to the electric motor. The electric motor functions as either a motor or a generator depending on the travel status of the work vehicle. In an EMT, the rotation speed of the output shaft varies continuously in accordance with the variation in the speed of the electric motor.

The HMT uses a hydraulic motor in place of the electric motor in the EMT. The hydraulic motor functions as either a motor or a pump depending on the travel status of the work vehicle. Similar to the EMT, the rotation speed ratio of the output shaft to the input shaft varies continuously in accordance with the variation in the rotation speed ratio of the hydraulic motor.

SUMMARY

A hybrid vehicle equipped with a power transmission device provided with the above-described EMT or HMT is a series hybrid, a parallel hybrid, or a split power transmission based on the positional relationship between the engine, the motor-generator, the planetary gear mechanism, and the output shaft. Additionally, a split power transmission may be an input split, an output split, or a compound split type. An input-split power transmission device is provided with a single planetary gear mechanism located near the input shaft of the gear shifting device (near the output shaft of the engine). An output-split power transmission device is provided with a single planetary gear mechanism located near the output shaft of the gear shifting device (near the axle). A compound-split power transmission device is provided with two or more planetary gear mechanisms located near the input shaft and near the output shaft of the gear shifting device.

A battery or a capacitor is installed in a vehicle provided with an EMT for driving the electric motor. Thus, when the vehicle is in standby in a neutral or in a key-off state (i.e., where the engine stops because a key is turned to an off position), the amount of power in the battery or the capacitor will be less than the normal charge due to the effects of natural electric discharge. If an operation lever is switched to either the F-position or the R-position while there is less charge and the vehicle is started, the vehicle causes the motor to operate as a generator in accordance with the driving of the engine to return the battery or capacitor to its normal charge. As a result, the acceleration of the vehicle suffers because the driving of the engine is being used to charge the battery or capacitor during acceleration. Therefore, it is preferable to charge the battery or capacitor as appropriate if there is less charge even if it is during a stop or a neutral state where acceleration is not needed. Series hybrid and parallel hybrid output split vehicles can connect the output shaft of the engine to the rotation shaft of the motor-generator without going through the planetary gear mechanism; therefore, the generator may be operated via rotation of the engine to facilitate charging the battery and the like in the hybrid vehicle. However, given that the input split type and the compound split type transmissions connect the output shaft of the engine and the motor-generator via the planetary gear mechanisms, the desired kind of charging cannot be performed without modifying a portion of the rotation elements in the planetary gear mechanisms. Accordingly, charging a vehicle with an input split or compound split type transmission while the vehicle is stopped or in the neutral state tends to be more difficult compared to other transmission types.

The present invention proposes a work vehicle capable of charging and a work vehicle control method for charging which is applicable even to work vehicles equipped with a power transmission device configured to connect the output shaft of an engine to the rotation shaft of a motor-generator via a planetary gear mechanism.

A work vehicle according to a first exemplary embodiment of the present invention is provided with an engine, a hydraulic pump, a work implement, a travel apparatus, a power transmission device, a controller, and an energy storage unit. The hydraulic pump is driven by the engine; the work implement is driven by hydraulic fluid discharged from the hydraulic pump. The engine drives the travel apparatus. The power transmission device transmits the drive power from the engine to the travel apparatus. A power transmission device includes an input shaft, an output shaft, a gear mechanism, an energy-generating motor, a first clutch, and a locking device. The gear mechanism includes a planetary gear mechanism, and is configured to transmit the rotations of the input shaft to the output shaft. The planetary gear mechanism includes a first rotation element, a second rotation element, and a third rotation element, which are mutually different. The first clutch is provided in the power transmission route between the engine and the first rotation element. The locking device is configured to lock or release the second rotation element. The energy-generating motor is connected to the third rotation element. The power transmission device is configured such that changing the speed of the energy-generating motor changes the speed ratio of the output shaft relative to the input shaft in the power transmission device. The energy storage unit is configured to store the energy generated by the energy-generating motor. The controller is configured to control the power transmission device. The controller includes a speed adjustment unit configured to adjust the speed of the two rotation shafts in the first clutch. The controller locks the second rotation element using the locking device, converges the rotation speeds of two rotation shafts in the first clutch using the speed adjustment unit to cause the first clutch to engage, and rotates the energy-generating motor using the drive power from the engine to thereby accumulate energy in the energy storage unit.

The speed adjustment unit may be configured to cause the first clutch to engage while slipping the first clutch to allow the speeds of the two rotation shafts in the first clutch to converge when the energy stored in the energy storage unit is less than or equal to a first predetermined amount.

One of the rotation shafts in the first clutch may be a clutch input shaft connected to the output shaft of the engine; the other rotation shaft in the first clutch may be a clutch output shaft connected to the output shaft of the energy-generating motor via the second rotation element in the planetary gear mechanism, and the speed adjustment unit may be configured to control the motor so that the speed of the clutch output shaft converges with the speed of the clutch input shaft when the energy stored in the energy storage unit is greater than a first predetermined amount.

The locking device may include a parking brake configured to stop the output shaft. Further, the controller may be configured to engage the parking brake thereby locking the second rotation element when the energy stored in the energy storage unit is less than or equal to a second predetermined amount.

The locking device may include a connected motor that is connected to the second rotation element. Further, the controller may be configured to control the connected motor so that the speed of the connected motor becomes zero, thereby locking the second rotation element when the energy stored in the energy storage unit is greater than a second predetermined amount.

The controller may be configured to drive the energy-generating motor with the energy stored in the energy storage unit so that the energy-generating motor generates a torque in a direction that hinders rotation thereof due to the drive power from the engine when accumulating energy in the energy storage unit, when the energy stored in the energy storage unit is greater than a third predetermined amount.

The energy storage unit may be a capacitor.

The controller may be configured to increase the speed of the engine after the first clutch is engaged.

A method of controlling a work vehicle according to a second exemplary embodiment of the invention is a method of controlling a below described work vehicle. The work vehicle is provided with an engine, a hydraulic pump, a work implement, a travel apparatus, a power transmission device, a controller, and an energy storage unit. The hydraulic pump is driven by the engine. The work implement is driven by hydraulic fluid discharged from the hydraulic pump. The engine drives the travel apparatus. The power transmission device transmits the drive power from the engine to the travel apparatus. A power transmission device includes an input shaft, an output shaft, a gear mechanism, an energy-generating motor, a first clutch, and a locking device. The gear mechanism includes a planetary gear mechanism, and is configured to transmit the rotations of the input shaft to the output shaft. The planetary gear mechanism includes a first rotation element, a second rotation element, and a third rotation element, which are mutually different. The first clutch is provided on the power transmission route between the engine and the first rotation element. The locking device is configured to lock or release the second rotation element. The energy-generating motor is connected to the third rotation element. The power transmission device is configured such that changing the speed of the energy-generating motor changes the speed ratio of the output shaft relative to the input shaft in the power transmission device. The energy storage unit is configured to store the energy generated by the energy-generating motor. The control method includes a step of locking the second rotation element using the locking device, a step of converging the rotation speeds of two rotation shafts in the first clutch to cause the first clutch to engage, and a step of rotating the energy-generating motor using the drive power from the engine to thereby accumulate energy in the energy storage unit.

A work vehicle and a work vehicle control method according to exemplary embodiments of the present invention locks a second rotation element in a planetary gear mechanism, converges the rotation speeds of two rotation shafts in a first clutch to cause the first clutch to engage, and causes an energy-generating motor rotates using the drive power from the engine to thereby accumulate energy in an energy storage unit. Hereby, a work vehicle capable of charging and a work vehicle control method for charging are provided that are applicable even to work vehicles provided with a power transmission device configured to connect the output shaft of an engine and the rotation shaft of a motor-generator via a planetary gear mechanism.

DESCRIPTION OF EXEMPLARY EMBODIMENTS

First Exemplary Embodiment

Figure 1:
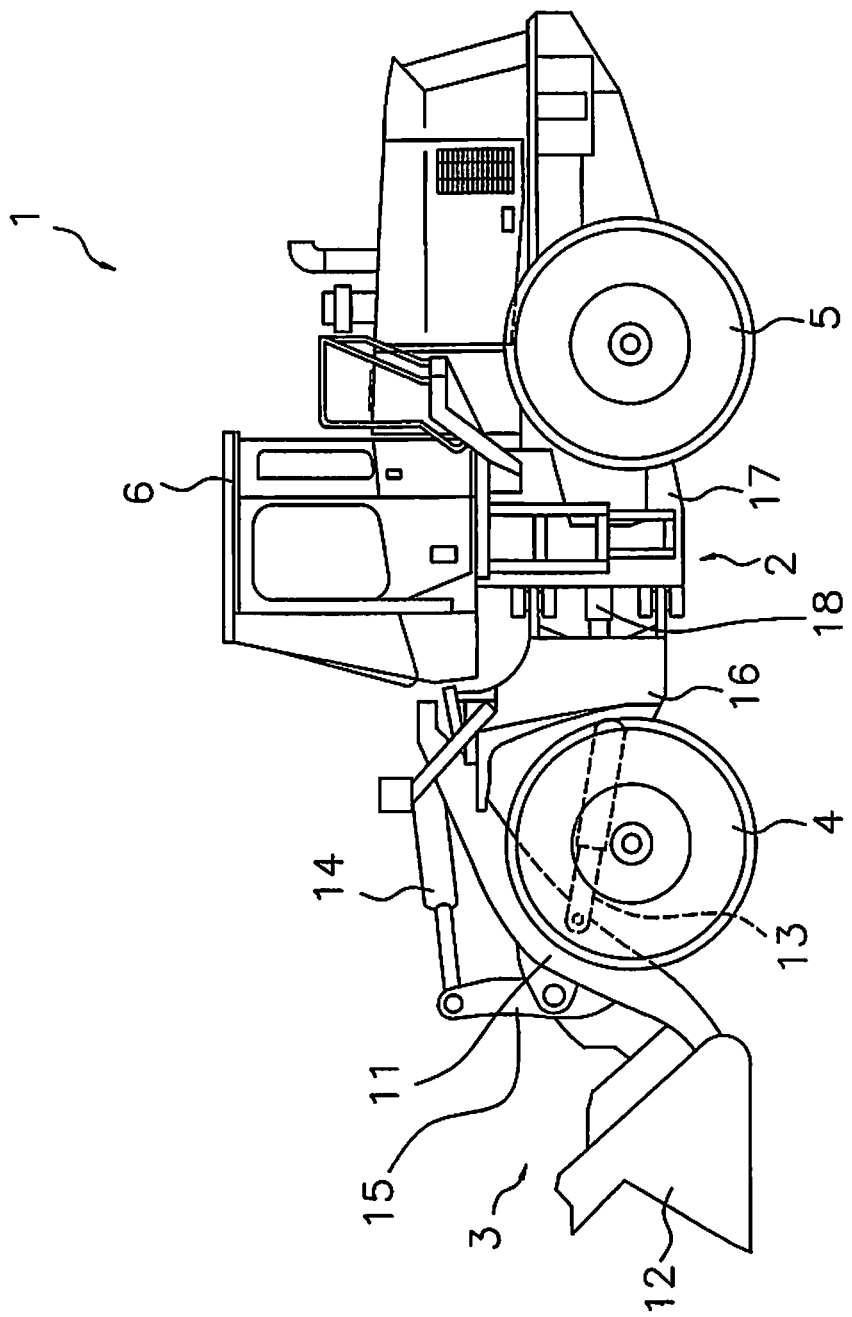
FIG. 1 is a side view of a work vehicle.

Exemplary embodiments of the present invention are described below with reference to the drawings. A side view of a work vehicle 1 according to an exemplary embodiment of the present invention is illustrated in FIG. 1. As illustrated in FIG. 1, the work vehicle 1 is provided with a vehicle frame 2, a work implement 3, running wheels 4, 5, and a cab 6. The work vehicle 1 is a wheel loader, and travels by rotationally driving the running wheels 4, 5. The work vehicle 1 uses the work implement 3 to perform work such as excavation or digging.

The vehicle frame 2 includes a front frame 16 and a rear frame 17. The front frame 16 and the rear frame 17 are attached to be able to turn relative to each other horizontally. The work implement 3 and the running wheels 4 are attached to the front frame 16. The work implement 3 is driven by hydraulic fluid from a later-described work implement pump 23 (refer to FIG. 2). A boom 11 and a bucket 12 are provided on the work implement 3. The boom 11 is mounted to the vehicle frame 2. The work implement 3 is provided with a lift cylinder 13, and a bucket cylinder 14. The lift cylinder 13 and the bucket cylinder 14 are hydraulic cylinders. One end of the lift cylinder 13 is attached to the front frame 16. The other end of the lift cylinder 13 is attached to the boom 11. Hydraulic fluid from the work implement pump 23 extends and retracts the lift cylinder 13 to thereby rotate the boom 11 vertically. A bucket 12 is attached at the front end of the boom 11. One end of the bucket cylinder 14 is attached to the vehicle frame 2. The other end of the bucket cylinder 14 is attached to the bucket 12 via a bell crank 15. Hydraulic fluid from the work implement pump 23 extends and retracts the bucket cylinder 14 to thereby rotate the bucket 12 vertically.

The cab 6 and the running wheels 5 are attached to the rear frame 17. The cab 6 is mounted on the vehicle frame 2. Arranged within the cab 6 are a seat whereon an operator may sit, an operation device (later described), and the like.

The work vehicle 1 includes a steering cylinder 18. The steering cylinder 18 is attached to the front frame 16 and the rear frame 17. The steering cylinder 18 is also a hydraulic cylinder. Hydraulic fluid from a later-described steering pump 28 extends and retracts the steering cylinder 18 to thereby change the travel direction of the work vehicle 1 to the left or the right.

Figure 2:
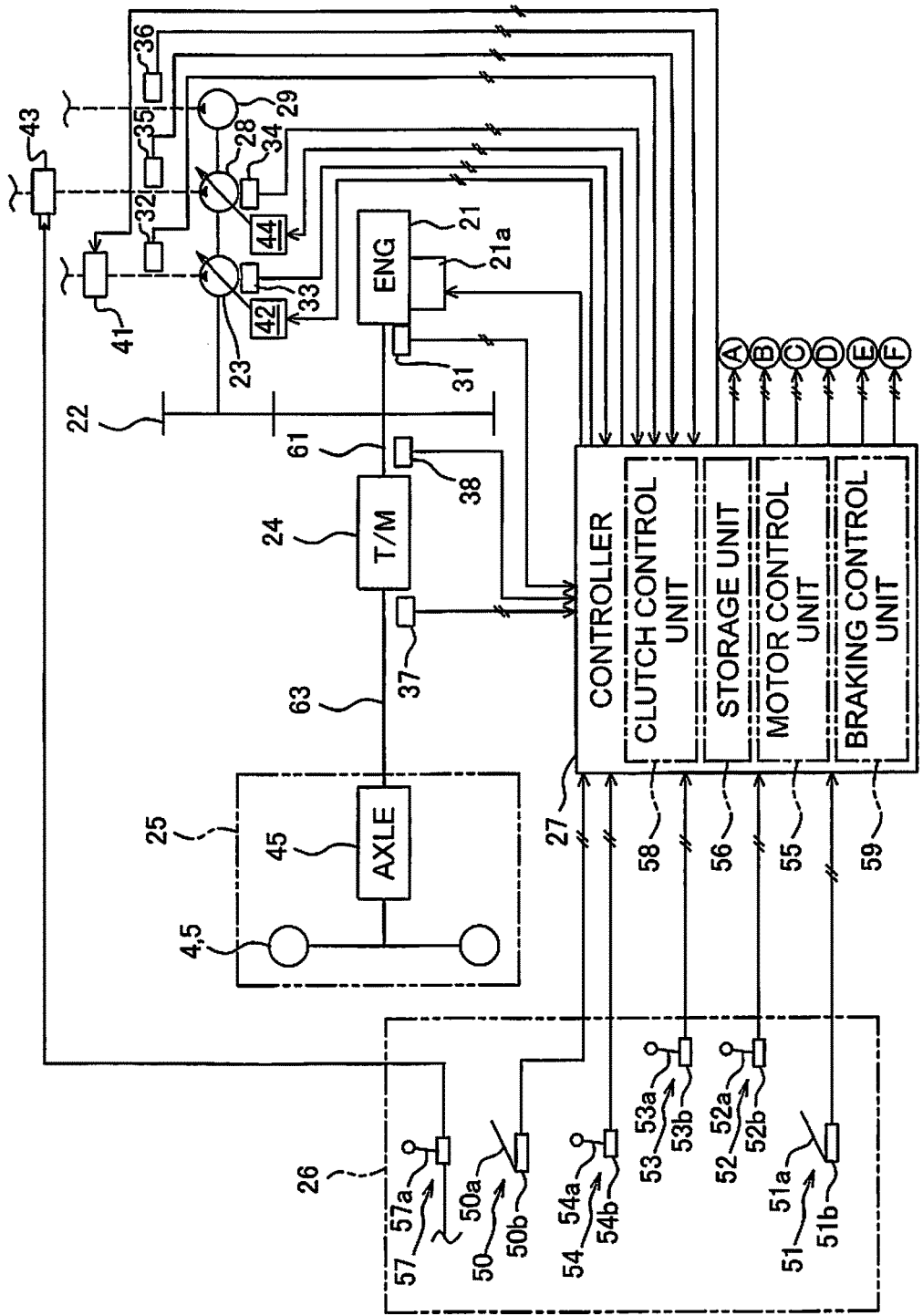
FIG. 2 is a schematic view illustrating a configuration of the work vehicle.

FIG. 2 is a schematic view illustrating a configuration of the work vehicle 1 according to an exemplary embodiment. As illustrated in FIG. 2, the work vehicle 1 is equipped with an engine 21, a PTO 22, a power transmission device 24, a travel apparatus 25, an operation device 26, a controller 27, and the like.

The engine 21 may be a diesel engine. Output of the engine 21 is controlled by adjusting the amount of fuel injected into a cylinder in the engine 21. The amount of fuel may be adjusted via the controller 27 controlling a fuel injector 21a installed in the engine 21. The work vehicle 1 is provided with an engine-speed detector 31. The engine-speed detector 31 detects the speed of the engine and sends the controller 27 a detection signal indicative of the engine speed.

The work vehicle 1 may include the work implement pump 23, the steering pump 28, and a transmission pump 29. The work implement pump 23, the steering pump 28, and the transmission pump 29 are hydraulic pumps. The PTO 22 transmits a portion of the drive power from the engine 21 to the hydraulic pumps 23, 28, 29. In other words, the PTO 22 distributes the drive power from the engine 21 to the hydraulic pumps 23, 28, 29, and to the power transmission device 24.

The work implement pump 23 is driven by drive power from the engine 21. The hydraulic fluid discharged from the work implement pump 23 is supplied to the above-described lift cylinder 13 and the bucket cylinder 14 via a work implement control valve 41. The work vehicle 1 is equipped with a work-implement-pump pressure detector 32. The work-implement-pump pressure detector 32 detects the discharge pressure of the hydraulic fluid expelled from the work implement pump 23 (referred to as "work-implement pump pressure" below), and sends the controller 27 a detection signal indicative of the work-implement pump pressure.

The work implement pump 23 is a variable displacement hydraulic pump. Changing the tilt angle of the swashplate or the tilt axis in the work implement pump 23 changes the discharge capacity of the work implement pump 23. The work implement pump 23 is connected to a first capacity control device 42. The first capacity control device 42 changes the tilt angle in the work implement pump 23 under the control of the controller 27. The controller 27 may thereby control the discharge capacity of the work implement pump 23. For instance, the first capacity control device 42 may adjust the tilt angle in the work implement pump 23 to create a fixed pressure differential in front of and behind the work implement control valve 41. The first capacity control device 42 may also change the tilt angle in the work implement pump 23 as desired in accordance with a command signal from the controller 27. More specifically, the first capacity control device 42 includes a first and a second valve (not shown). When the above-described work implement control valve 41 changes the amount of hydraulic fluid being supplied to the work implement 3, a pressure differential is generated between the discharge pressure from the work implement pump 23 and the pressure of the hydraulic fluid after passing through the work implement control valve 41, depending on the change in the position of the work implement control valve 41. The first valve, under control of the controller 27 adjust the tilt angle in the work implement pump 23 so that the pressure differential in front of and behind the work implement control valve 41 remains constant even when the load on the work implement 3 fluctuates. Additionally, the second valve under control of the controller 27 may further change the tilt angle in the work implement pump 23. The work vehicle 1 is equipped with a first tilt-angle detector 33. The first tilt-angle detector 33 detects the tilt angle in the work implement pump 23 and sends the controller 27 a detection signal representing the tilt angle.

The steering pump 28 is driven by drive power from the engine 21. The hydraulic fluid discharged from the steering pump 28 is supplied to the above-described steering cylinder 18 via a steering control valve 43. The work vehicle 1 is equipped with a steering pump pressure detector 35. The steering pump pressure detector 35 detects the pressure of the hydraulic fluid discharged from the steering pump 28 (termed "steering pump pressure" below), and sends the controller 27 a detection signal indicative of the steering pump pressure.

The steering pump 28 is a variable displacement hydraulic pump. Changing the tilt angle of the swashplate or the tilt axis in the steering pump 28 changes the discharge capacity of the steering pump 28. The steering pump 28 is connected to a second capacity control device 44. The second capacity control device 44 changes the tilt angle in the steering pump 28 under the control of the controller 27. The controller 27 may thereby control the discharge capacity of the steering pump 28. The work implement 1 is equipped with a second tilt-angle detector 34. The second tilt-angle detector 34 detects the tilt angle in the steering pump 28 and sends the controller 27 a detection signal representing the tilt angle.

The transmission pump 29 is driven by the drive power from the engine 21. The transmission pump 29 is a fixed displacement hydraulic pump. The hydraulic fluid discharged from the transmission pump 29 is supplied to clutches CF, CR, CL, CH in the power transmission device 24 via later-described clutch control valves VF, VR, VL, VH. A transmission pump pressure detector 36 detects the pressure of the hydraulic fluid discharged from the transmission pump 29 (termed "transmission pump pressure" below), and sends the controller 27 a detection signal indicative of the transmission pump pressure.

The PTO 22 transmits a portion of the drive power from the engine 21 to the power transmission device 24. The power transmission device 24 transmits the drive power from the engine 21 to the travel apparatus 25. The power transmission device 24 converts and outputs the drive power from the engine 21. The details on the configuration of the power transmission device 24 are described later.

The travel apparatus 25 includes an axle 45 and running wheels 4, 5. The engine 21 drives the travel apparatus 25. The axle 45 transmits the drive power from the power transmission device 24 to the running wheels 4, 5. Hereby, the running wheels 4, 5 rotate. The work vehicle 1 is provided with an output speed detector 37 and an input speed detector 38. The output speed detector 37 detects the rotation speed of the output shaft 63 in the power transmission device 24 (referred to as "output speed" below). Given that the output speed corresponds to the vehicle speed, the output speed detector 37 detects the vehicle speed due to the travel apparatus 25 by detecting the output speed. The input speed detector 38 detects the rotation speed of the input shaft 61 in the power transmission device 24 (referred to as "input speed" below). The output speed detector 37 sends the controller 27 a detection signal indicative of the output speed. The input speed detector 38 sends the controller 27 a detection signal indicative of the input speed.

Note that, instead of an output speed detector 37 and then input speed detector 38 a rotation speed detector that detects the rotation speed of rotation components inside the power transmission device 24 may be separately provided to send signals to the controller 27, and the controller 27 may then compute the input speed and the output speed from the rotation speed of the rotation components.

The operator manipulates the operation device 26. The operation device 26 may include a braking device 50, and acceleration device 51, a work implement operating device 52, a forward-reverse switching device 54, and a steering device 57. Note that the operation device 26 may further include a gear shifting device 53.

The acceleration device 51 includes an accelerator control 51a, and an acceleration detector 51b. The accelerator control 51a is operated to establish a target speed for the engine 21. The acceleration detector 51b detects the degree to which the acceleration device 51 is operated (termed "accelerator operation amount" below). The acceleration detector 51b sends the controller 27 a detection signal indicative of the accelerator operation amount.

The work implement operating device 52 contains a work implement control 52a and a work implement operation detector 52b. The work implement control 52a is operated to move the work implement 3. The work implement operation detector 52b detects the position of the work implement control 52a. The work implement operation detector 52b outputs a detection signal indicative of the position of the work implement control 52a to the controller 27.

The gear shifting device 53 includes a gear-shift control 53a, and a gear-shift detector 53b. The operator may manipulate the gear-shift control 53a to select a gear shifting pattern for the power transmission device 24. The gear-shift detector 53b detects the position of the gear-shift control 53a. The gear-shift detector 53b outputs a detection signal to the controller 27 indicative of the position of the gear-shift control 53a.

A forward-reverse switching device 54 contains a forward-reverse switching control 54a and a forward-reverse switch detector 54b. In the discussion that follows, the forward-reverse switching device 54, the forward-reverse switching control 54a, and the forward-reverse switch detector 54b are referred to as the FR operation device 54, the FR control 54a, and the FR switch detector 54b respectively. The FR operation device 54 may be selectively switched to a forward-travel position (F), a neutral position (N), and a reverse-travel position (R). The FR switch detector 54b detects the position of the FR control 54a. The FR switch detector 54b outputs a detection signal to the controller 27 indicative of the position of the FR control 54a.

The steering device 57 includes a steering control 57a. A pilot pressure is supplied to the steering control valve 43 based on the operation of the steering control 57a allowing the steering device 57 to thereby actuate the steering control valve 43. The operator may manipulate the steering control 57a to change the travel direction of the work vehicle 1 to the left or the right. Note that the steering device 57 may convert the operation of the steering control 57a into an electrical signal to actuate the steering control valve 43.

The braking device 50 includes a brake control 50a, and a braking detector 50b. The operator may manipulate the brake control 50a to operate the braking device generate a braking force for the work vehicle 1. The braking detector 50b detects the position of the brake control 50a. The braking detector 50b outputs a detection signal to the controller 27 indicative of the position of the brake control 50a. The brake control 50a includes a parking brake operation control that actuates a parking brake PB (later described) when operated. The parking brake operation control may be, for instance, a braking switch, or a parking lever manipulable by the operator. A pilot pressure is supplied to a parking brake control valve VB based on the operation of the parking brake operation control allowing the parking brake PB to thereby actuate the parking brake control valve VB. Finally, an operation signal is sent to the controller 27 when the parking brake operation control is operated.

The controller 27 includes a computing device, such as a CPU, and memory, such as RAM and ROM, and carries out processes for controlling the work vehicle 1. The controller 27 also includes a motor control unit 55 and a clutch control unit 58 for controlling the power transmission device 24, a braking control unit 59 for actuating the braking device 50, and a storage unit 56. The details on the configuration of the power transmission device 24 are described later. The storage unit 56 stores programs and data for controlling the work vehicle 1.

The controller 27 outputs a command signal to the fuel injector 21a indicative of a commanded throttle value to obtain a target speed in the engine 21 corresponding to the accelerator operation amount. The controller 27 controls the work implement control valve 41 on the basis of a detection signal from the work implement operation detector 52b and thereby controls the hydraulic pressure supplied to the hydraulic cylinders 13, 14. The hydraulic cylinders 13, 14 thereby extend and retract, moving the work implement 3.

Figure 3:
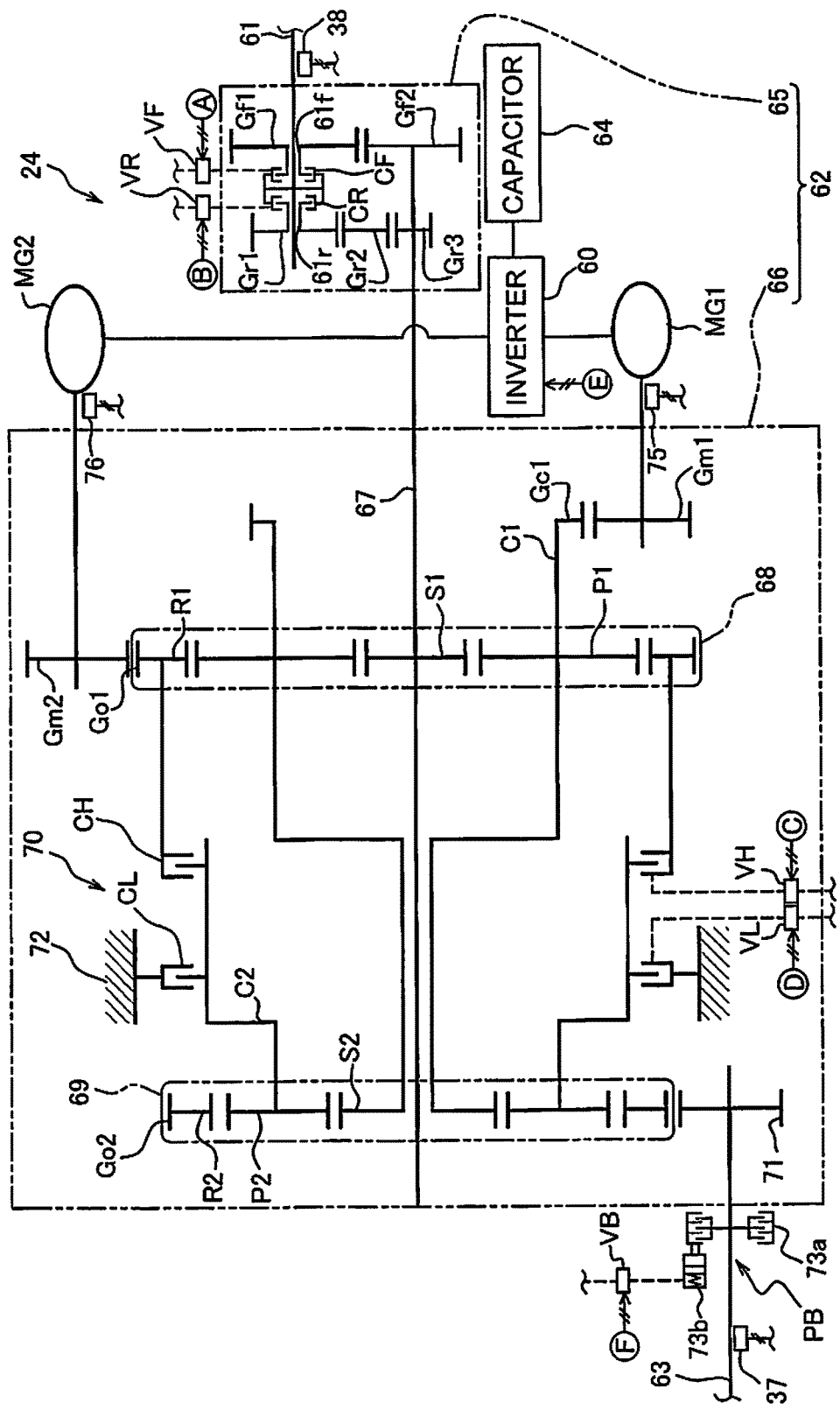
FIG. 3 is a schematic view illustrating a configuration of a power transmission device according to a first exemplary embodiment.

The details on the configuration of the power transmission device 24 are described next. FIG. 3 is a schematic view illustrating a configuration of the power transmission device 24. As illustrated in FIG. 3, the power transmission device 24 is provided with an input shaft 61, a gear mechanism 62, the output shaft 63, a first motor MG1, a second motor MG2, and a capacitor 64. The rotation speed ratio of the input shaft 61 to the output shaft 63 changes in the power transmission device 24 in accordance with the change in the speed of the first motor MG1, or the second motor MG2. The input shaft 61 is connected to the above described PTO 22. The rotations of the engine 21 are received by the input shaft 61 via the PTO 22. That is, the input shaft 61 is connected to the output shaft of the engine. The gear mechanism 62 transmits the rotations of the input shaft, 61 to the output shaft 63. The output shaft 63, connected to the above-described travel apparatus 25, transmits the rotations from the gear mechanism 62 to the travel apparatus 25.

The gear mechanism 62 transmits the drive power from the engine 21. When the speed of the first motor MG1 or the second motor MG2 changes in the gear mechanism 62, the gear mechanism 62 changes the speed ratio of the output shaft 63 to the input shaft 61. The gear mechanism 62 includes an FR switching mechanism 65, and a gear shifting mechanism 66.

The FR switching mechanism 65 includes an F-clutch CF, and R-clutch CR, and F-clutch output shaft 61$f$, and R-clutch output shaft 61$r$, a first F-clutch gear Gf1, a second F-clutch gear Gf2, a first R-clutch gear Gr1, a second R-clutch gear Gr2, and a third R-clutch gear Gr3. The F-clutch CF connects or disconnects the F-clutch output shaft 61$f$ and the input shaft 61 (F-clutch input shaft). The R-clutch CR connects or disconnects the R-clutch output shaft 61$r$ and the input shaft 61 (R-clutch input shaft). The first F-clutch gear Gf1 is connected to the F-clutch output shaft 61$f$. The first R-clutch gear Gr1 is connected to the R-clutch output shaft 61$r$. The second F-clutch gear Gf2 is connected to the power transmission shaft 67 and engaged with the first F-clutch gear Gf1. The third R-clutch gear Gr3 is connected to the power transmission shaft 67 and engaged with the second R-clutch gear Gr2. The second R-clutch gear Gr2 is engaged with the first R-clutch gear Gr1 and the third R-clutch gear Gr3. The second F-clutch gear Gf2 and the third R-clutch gear Gr3 are connected to the output shaft in the second motor MG2 via the power transmission shaft 67, first sun gear S1, first planetary gears P1, first ring gear R1, first outer ring gear Go1. That is, the F-clutch output shaft 61$f$ and the R-clutch output shaft 61$r$ are connected to the output shaft in the second motor MG2 via at least one rotation element in the first planetary gear mechanism.

As illustrated in FIG. 3, the first and second F-clutch gears Gf1, Gf2, and the first through third R-clutch gear Gr1-Gr3 are merely examples, and may be any configuration so long as the rotation direction of the power transmission shaft 67 when the F-clutch CF is connected, and the rotation direction of the power transmission shaft 67 when the R-clutch CR is connected are mutually opposite.

The F-clutch CF and the R-clutch CR are hydraulic, with the transmission pump 29 supplying the hydraulic fluid to each of clutches CF, CR. An F-clutch control valve VF controls the hydraulic fluid supplied to the F-clutch CF. An R-clutch control valve VR controls the hydraulic fluid supplied to the R-clutch CR. The clutch control valves VF, VR are controlled via the command signals from the clutch control unit 58. The F-clutch CF and the R-clutch CR may be switched on (engaged) or switched off (disengaged) which thereby switches the direction of rotation of the output from the FR switching mechanism 65. That is, the F-clutch CF is connected to the gear mechanism 62 (more specifically, to the first F-clutch gear GM that orients the travel apparatus 25 to travel forward. Additionally the R-clutch CR is connected to the gear mechanism 62 (more specifically, to the first R-clutch gear Gr1) that orients the travel apparatus 25 to travel in reverse.

The gear shifting mechanism 66 includes the power transmission shaft 67, the first planetary gear mechanism 68, the second planetary gear mechanism 69, a hi-lo switching mechanism 70, and an output gear 71. The power transmission shaft 67 is connected to the FR switching mechanism 65.

The first planetary gear mechanism 68 includes a first sun gear S1, a plurality of first planetary gears P1, a first carrier C1 supporting the plurality of first planetary gears P1, and a first ring gear R1. The first sun gear S1 is connected to the power transmission shaft 67. For convenience, the rotation element in the first planetary gear mechanism 68 connected to the engine 21 via the FR switching mechanism 65 is referred to as the first rotation element. That is, the first sun gear S1 corresponds to the first rotation element. The plurality of first planetary gears P1 engages with the first sun gear S1 and is supported on the first carrier C1 to be able to rotate. A first carrier gear Gc1 is provided on the periphery of the first carrier C1. The first ring gear R1 is able to rotate while engaged with the plurality of first planetary gears P1. The first ring gear R1 is also provided with a first outer ring gear Go1 at the periphery thereof.

The second planetary gear mechanism 69 includes a second sun gear S2, a plurality of second planetary gears P2, a second carrier C2 supporting the plurality of second planetary gears P2, and a second ring gear R2. The second sun gear S2 is connected to the first carrier C1. The plurality of second planetary gears P2 engages with the second sun gear S2 and is supported on the second carrier C2 to be able to rotate. The second ring gear R2 is able to rotate while engaged with the plurality of second planetary gears P2. The second ring gear R2 also is provided with a second outer ring gear Go2 at the periphery thereof. The second outer ring gear Go2 engages with the output gear 71 whereby the rotation of the second ring gear R2 is output to the output shaft 63 via the output gear 71. For convenience, the rotation element in the second planetary gear mechanism 69 connected directly to rotation element in the first planetary gear mechanism 68 on the carrier, bypassing the clutch, is referred to as the fourth rotation element. That is, the second sun gear S2 corresponds to the fourth rotation element. Additionally, the rotation element in the second planetary gear mechanism 69 connected to the output shaft 63 is referred to as the sixth rotation element. That is, the second ring gear R2 corresponds to the sixth rotation element.

The hi-lo switching mechanism 70 is used to selectively switch the drive power transmission route in the power transmission device 24 between a first mode and a second mode. In the first exemplary embodiment the first mode is a Lo mode that may be selected when the speed ratio is low, and the second mode is a Hi mode that may be selected when the speed ratio is high. The hi-lo switching mechanism 70 includes an H-clutch CH that is "on" during the Hi mode, and an L-clutch CL that is "on" during the Lo mode. The H-clutch CH connects or disconnects the first ring gear R1 and the second carrier C2. Additionally, the L-clutch CL connects or disconnects the second carrier C2 and a fixed end 72, thereby prohibiting or permitting rotation of the second carrier C2. For convenience, the rotation element in the second planetary gear mechanism 69 connected to the L-clutch CL and the H-clutch CH is referred to as the fifth rotation element. Accordingly the second carrier C2 corresponds to the fifth rotation element.

The H-clutch CH is configured so that the H-clutch CH can limit the movement of the second carrier C2 (fifth rotation element) by connecting the first ring gear R1 and the second carrier C2, or release any limitations on the movement of the second carrier C2 (fifth rotation element) by disconnecting the first ring gear R1 and the second carrier C2. The L-clutch CL is similarly configured so that the L-clutch CL stops (locks) the second carrier C2 (fifth rotation element) or releases the second carrier C2 (fifth rotation element). In other words, the L-clutch CL is configured so that the L-clutch CL can limit the movement of the second carrier C2 (fifth rotation element) by connecting the second carrier C2 and the fixed end 72, or release any limitations on the movement of the second carrier C2 (fifth rotation element) by disconnecting the second carrier C2 from the fixed end 72. Thus, in the first exemplary embodiment, a component configured to limit the movement of or release limitations on the movement of the fifth rotation element is referred to as a rotation-element locking means or locking device. According to this definition, the H-clutch CH and the L-clutch CL are rotation-element locking means or locking devices.

Note that since the second carrier C2 is locked when the H-clutch CH is disconnected and the L-clutch CL is connected, the second planetary gear mechanism 69 operates identically to a so-called deceleration apparatus where the speed reduction ratio is locked. Therefore, the second planetary gear mechanism 69 cannot provide continuously variable shifting. Accordingly, the power transmission device 24 is in input split mode during the Lo mode. Whereas, since the first ring gear R1 and the second carrier C2 are connected when the L-clutch CL is disconnected and the H-clutch CH is connected, the first planetary gear mechanism 68 and the second planetary gear mechanism 69 can provide continuously variable shifting. Therefore, the power transmission device 24 is in compound split mode during Hi mode.

Note that the clutches CH, CL are hydraulic, with the transmission pump 29 supplying the hydraulic fluid thereto. An H-clutch control valve VH controls the hydraulic fluid bound for the H-clutch CH. An L-clutch CL control valve VL controls the hydraulic fluid bound for the L-clutch CL. The clutch control valves VH, VL are controlled via the command signals from the clutch control unit 58.

The first motor MG1 and the second motor MG2 function as drive motors that use electrical energy to generate drive power. The first motor MG1 and the second motor MG2 may also function as generators which use the drive power entering therein to generate electrical energy; (in the explanation that follows, this kind of motor is referred to as an energy-generating motor). When the first motor MG1 rotates in a direction reverse of the rotation direction when the first motor MG1 is driven, the first motor MG1 is operating as a generator. A first motor gear Gm1 secured to the output shaft of the first motor MG1, engages with the first carrier gear Gc1. That is, the first motor MG1 is connected to the first carrier C1 in the first planetary gear mechanism 68. The first motor MG1 can control the speed of the F-clutch output shaft 61f and the R-clutch output shaft 61r when the F-clutch CF and the R-clutch CR are disconnected and the first ring gear R1 in the first planetary gear mechanism 68 is locked. Additionally, the engine 21 can cause the rotation shaft in the first motor MG1 to rotate when the first ring gear R1 in the first planetary gear mechanism 68 is locked.

For convenience, the rotation element in the first planetary gear mechanism 68 connected to the motor between the first motor MG1 and the second motor MG2 acting as the drive motor is referred to as the second rotation element. Further the rotation element in the first planetary gear mechanism 68 connected to the motor between the first motor MG1 and the second motor MG2 acting as a generator is referred to as the third rotation element. The first carrier C1 corresponds to the second rotation element when the first motor MG1 acts as the drive motor; and the first carrier C1 corresponds to the third rotation element when the first motor MG1 acts as the generator. With the first rotation element through third rotation element defined as above, the first, second, and third rotation elements are mutually different elements. Similarly, the fourth, fifth, and sixth rotation elements are mutually different elements. Finally, it can be stated that the fourth rotation element in the second planetary gear mechanism 69 (the second sun gear S2) is connected to one of the second rotation element and the third rotation element in the first planetary gear mechanism 68.

An inverter 60 is connected to the first motor MG1; a command signal is supplied to the inverter 60 from a motor control unit 55 that controls the motor torque in the first motor MG1. Further details on the configuration of the inverter 60 are described later. A first motor speed detector 75 detects the speed of the first motor MG1. The first motor speed detector 75 sends the controller 27 a detection signal indicative of the speed of the first motor MG1.

The second motor MG2 is configured identically to the first motor MG1. A second motor gear Gm2 secured to the output shaft of the second motor MG2, engages with the first outer ring gear Go1. That is, the second motor MG2 is connected to the first outer ring gear Go1 (i.e., the first ring gear R1) in the first planetary gear mechanism 68. With the above definition, the first ring gear R1 corresponds to the second rotation element when the second motor MG2 acts as the drive motor; and the first ring gear R1 corresponds to the third rotation element when the second motor MG2 acts as the generator. The second motor MG2 can control the speed of the F-clutch output shaft 61f and the R-clutch output shaft 61r when the first carrier C1 in the first planetary gear mechanism 68 is locked. Additionally, the engine 21 can cause the rotation shaft in the second motor MG2 to rotate when the first carrier C1 in the first planetary gear mechanism 68 is locked.

The first carrier C1 and the first outer ring gear Go1 (i.e., the first ring gear R1) can be locked when the first motor MG1 and the second motor MG2 are operating as drive motors and are controlled so that the speeds thereof are zero. In the explanation that follows, the motor connected to the second rotation element in the first planetary gear mechanism is called the connected motor. Moreover, a rotation element used to lock or release the second rotation element in the first planetary gear mechanism 68 is referred to as a controlling rotation element, and the component used for locking or releasing the second rotation element is referred to as a locking means or locking device. Therefore, the locking means or locking device includes the connected motor (i.e., the first motor MG1 or the second motor MG2). Furthermore, when the first carrier C1 (second rotation element) is locked due to setting the speed of the first motor MG1 to zero, the rotation shaft of the first motor MG1 then corresponds to the controlling rotation element. Additionally, when the first ring gear R1 (second rotation element) is locked due to setting the speed of the second motor MG2 to zero, the rotation shaft of the second motor MG2 then corresponds to the controlling rotation element. Note that the controlling rotation element may be at least one rotation element between the second rotation element and the connected motor.

The inverter 60 is connected to the second motor MG2; a command signal is supplied to the inverter 60 from the motor control unit 55 that controls the motor torque in the second motor MG2. In the first exemplary embodiment, the inverter 60 is exemplified by an integrated inverter used to drive both the first motor MG1 and the second motor MG2, however separate inverters may be used to drive the first motor MG1 and the second motor MG2 respectively. Further details on the configuration of the inverter 60 are described later. A second motor speed detector 76 detects the speed of the second motor MG2. The second motor speed detector 76 sends the controller 27 a detection signal indicative of the speed of the second motor MG2.

The capacitor 64 functions as an energy storage unit storing the energy generated by the motors MG1, MG2. That is, the capacitor 64 stores the power generated by the motors MG1, MG2 when the total amount of energy generated is larger than the total amount of energy consumed by the motors MG1, MG2. The capacitor 64 discharges energy power when the total amount of energy generated by the motors MG1, MG2 is greater than the total amount of energy consumed by the motors MG1, MG2. That is, the motors MG1, MG2 may be driven by the power stored in the capacitor 64. A transformer 86 (FIG. 4) is provided between the capacitor 64 and the inverter 60. The transformer 86 is described later. Note that the controller 27 monitors energy currently stored in the capacitor 64, and uses the monitoring results in various kinds of control (later described). In addition, a battery or other forms of energy storing means may be used in place of the capacitor 64. However, compared to other energy storing means such as battery, a capacitor 64 is capable of high-speed charging and high-speed discharging. The work vehicle 1 performs a shuttling operation, i.e., switching between forward and reverse within a short time; therefore, a capacitor is more suitable than a battery as an energy storage unit in the work vehicle 1 in terms of an ability to charge efficiently.

Note that the expression used to describe the size of the current stored differs when referring to a capacitor and when referring to a battery. For instance, the size of current stored in a capacitor is usually expressed as a voltage, while the size of the current stored in a battery is expressed in ampere-hours (Ah). In the first exemplary embodiment, the size of the current stored by the energy storage unit is expressed as the amount of electricity or the charge, and the terms amount of electricity and electric charge are assumed to encompass the above described concept.

The motor control unit 55 typically receives detection signals from the various detectors and provides the inverter 60 with command signals representing a commanded torque or a commanded speed for the motors MG1, MG2. However, in this first exemplary embodiment, the motor control unit 55 includes a speed adjustment unit that adjusts the speed of the F-clutch output shaft 61$f$ and the R-clutch output shaft 61$r$ so that the motors MG1, MG2 can approach the speed of the input shaft 61 (i.e., the input shaft of the F-clutch CF and the input shaft of the R-clutch CR) when driven by the engine 21.

In addition, the clutch control unit 58 typically provides the various clutch control valves VF, VR, VH, VL with command signals used to control the clutch pressure in the clutches CF, CR, CH, CL. However, in this first exemplary embodiment the clutch control unit 58 includes a speed adjustment unit that adjusts the speed of the input shaft 61 (i.e., the input shaft of the F-clutch CF and the input shaft of the R-clutch CR) and the speed of the F-clutch output shaft 61$f$ and the R-clutch output shaft 61$r$ by slipping and engaging the F-clutch CF and the R-clutch CR.

The power transmission device 24 is further provided with a parking brake PB and a parking brake control valve VB. The parking brake PB can switch between an engaged state, and a disengaged state. In the engaged state the parking brake PB stops the output shaft 63. In the disengaged state the parking brake PB releases the output shaft 63. When the L-clutch CL is connected (the fifth rotation element in the second planetary gear mechanism 69 is stationary) and the parking brake PB stops the output shaft 63, the first carrier C1 (the second rotation element in the first planetary gear mechanism 68) is stationary. Accordingly, the parking brake PB is included in the above-described locking means.

The parking brake control valve VB is controlled on the basis of command signals from a braking control unit 59 (i.e. the controller 27). The braking control unit 59 controls the parking brake control valve VB to thereby switch the parking brake PB between the engaged stated and the disengaged state. Usually the parking brake PB is switched between the engaged state and the disengaged state in accordance with the operation of a parking brake operation control. Despite that, the braking control unit 59 can switch the parking brake PB between the engaged stated and the disengaged state without the operation of the parking brake operation control when a predetermined condition is met. Further details on this predetermined condition are described later.

The parking brake PB contains a brake disc portion 73$a$, and a piston portion 73$b$. The pressure of the hydraulic fluid supplied to the piston portion 73$b$ causes the piston portion 73$b$ and the plurality of brake discs in the brake disc portion 73$a$ to come in contact with each other. The parking brake PB is thereby in the engaged state. Additionally, discharging hydraulic fluid from the piston portion 73$b$ causes the piston portion 73$b$ and the brake discs to be held out of contact with each other due to the elastic force of an elastic component provided in the piston portion 73$b$. The parking brake PB is thereby in the disengaged state.

Figure 4:
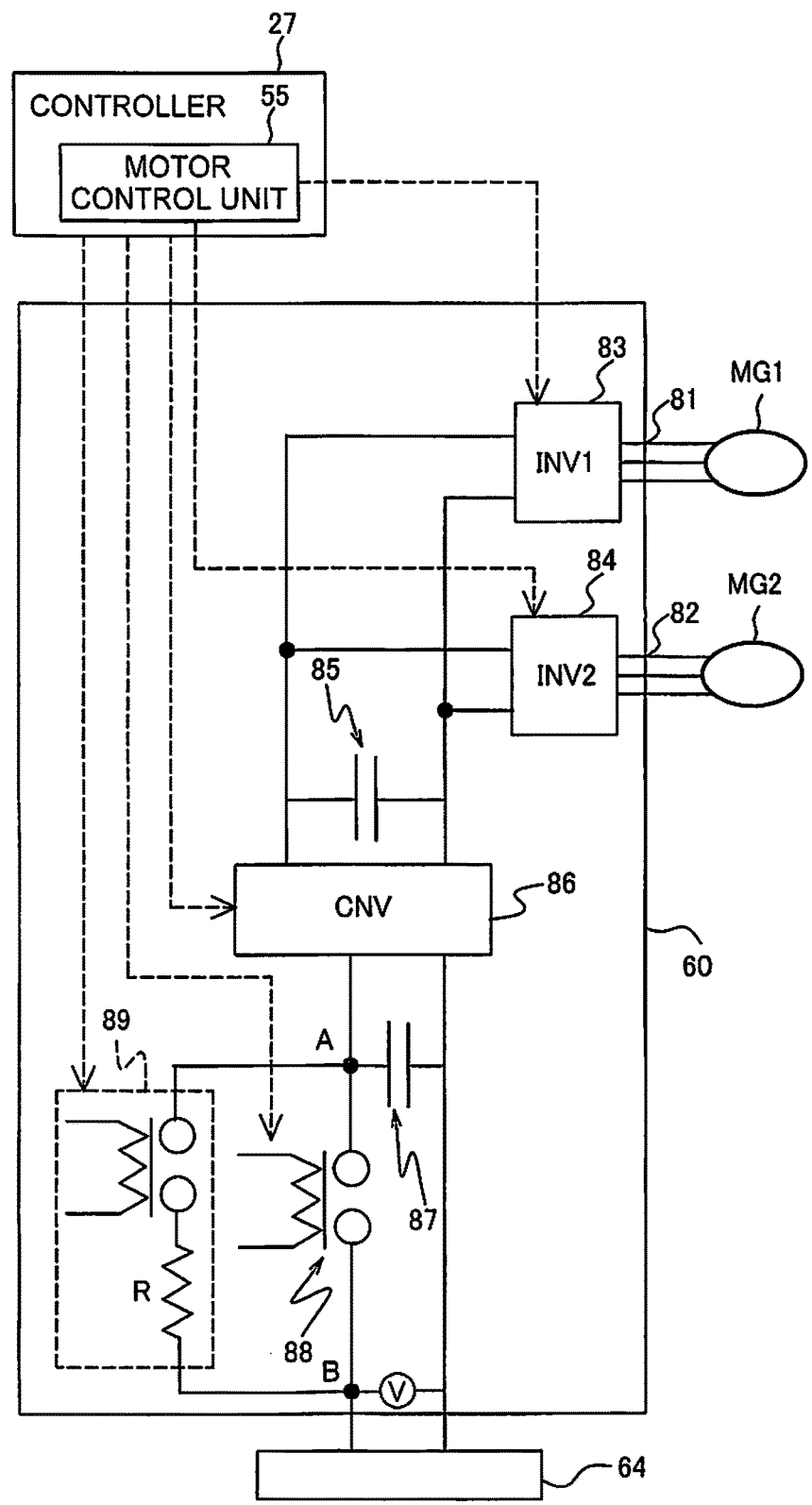
FIG. 4 illustrates a detailed internal configuration for an inverter.

FIG. 4 illustrates the details of the internal configuration of the inverter 60, and the connection relationship between the inverter 60 and the motors MG1, MG2, and the capacitor 64. The inverter 60 is an integrated inverter including an output terminal to the first motor MG1, and an output terminal to the second motor MG2. The inverter 60 also includes a first output terminal 81, a second output terminal 82, a first internal inverter 83, a second internal inverter 84, a first capacitor 85, a transformer 86, a second capacitor 87, a main contactor 88, and a contactor-with-resistor 89.

The first output terminal 81 connects the first motor MG1 and the first internal inverter 83. The first output terminal 81 is preferably a three-phase output terminal for controlling the first motor MG1. The second output terminal 82 connects the second motor MG2 and the second internal inverter 84. The second output terminal 82 is preferably a three-phase output terminal for controlling the second motor MG2.

The first internal inverter 83 outputs a drive signal for varying the voltage and the frequency output to the first motor MG1 on the basis of a command signal from the motor control unit 55 the first motor MG1. The first internal inverter 83 is capable of outputting both a drive signal that causes the first motor MG1 to rotate clockwise and a drive signal that causes the first motor MG1 to rotate anticlockwise from a single power source made up by the capacitor 64. Additionally, the first internal inverter 83 converts the back EMF (electromotive force) generated due to the rotation of the first motor MG1 into a DC voltage and outputs the DC voltage to the capacitor 64 via the transformer 86. The terminals of the first internal inverter 83 outputs voltage of the same polarity to the capacitor 64 via the transformer 86 regardless of whether the first motor MG1 rotates clockwise or anticlockwise.

The second internal inverter 84 outputs a drive signal for varying the voltage and the frequency output to the second motor MG2 on the basis of a command signal from the motor control unit 55 the second motor MG2. The second internal inverter 84 is capable of outputting both a drive signal that causes the second motor MG2 to rotate clockwise and a drive signal that causes the second motor MG2 to rotate anticlockwise from a single power source made up by the capacitor 64. Additionally, the second internal inverter 84 converts the back EMF generated due to the rotation of the second motor MG2 into a DC voltage and outputs the DC voltage to the capacitor 64 via the transformer 86. The terminals of the second internal inverter 84 outputs voltage of the same polarity to the capacitor 64 via the transformer 86 regardless of whether the second motor MG2 rotates clockwise or anticlockwise.

The first capacitor 85 and the second capacitor 87 are provided for preventing ripples (inrush current), and the respective capacities are substantially smaller than the capacitor 64 and thus do not affect the power exchange. The transformer 86 includes an Insulated Gate Bipolar Transistor (IGBT). The transformer 86 adjusts whether the IGBT is on or off to convert the voltage from the capacitor 64 into the voltage in the power system between the transformer 86 and the inverters 83, 84 (e.g., 550V). Alternatively, the transformer 86 adjusts whether the IGBT is on or off to convert the voltage in the power system between the transformer 86 and the inverters 83, 84 into the voltage for the capacitor 64. Here, the voltage for the capacitor 64 is referred to as a first-order voltage, and the voltage in the power system between the transformer 86 and the inverters 83, 84 is also referred to as a second order voltage.

The main contactor 88 is an electromagnetic contactor; the main contactor 88 sends the power from the capacitor 64 to the transformer 86, or sends the power generated by the motors MG1, MG2 to the capacitor 64 through the transformer 86. The contactor-with-resistor 89 is an electromagnetic contactor with a resistor R added thereto. The contactor-with-resistor 89 is use during a preparation stage before charging using the motors MG1, MG2 is initiated. The details on how the contactor-with-resistor 89 is used are described later.

Figure 5A:
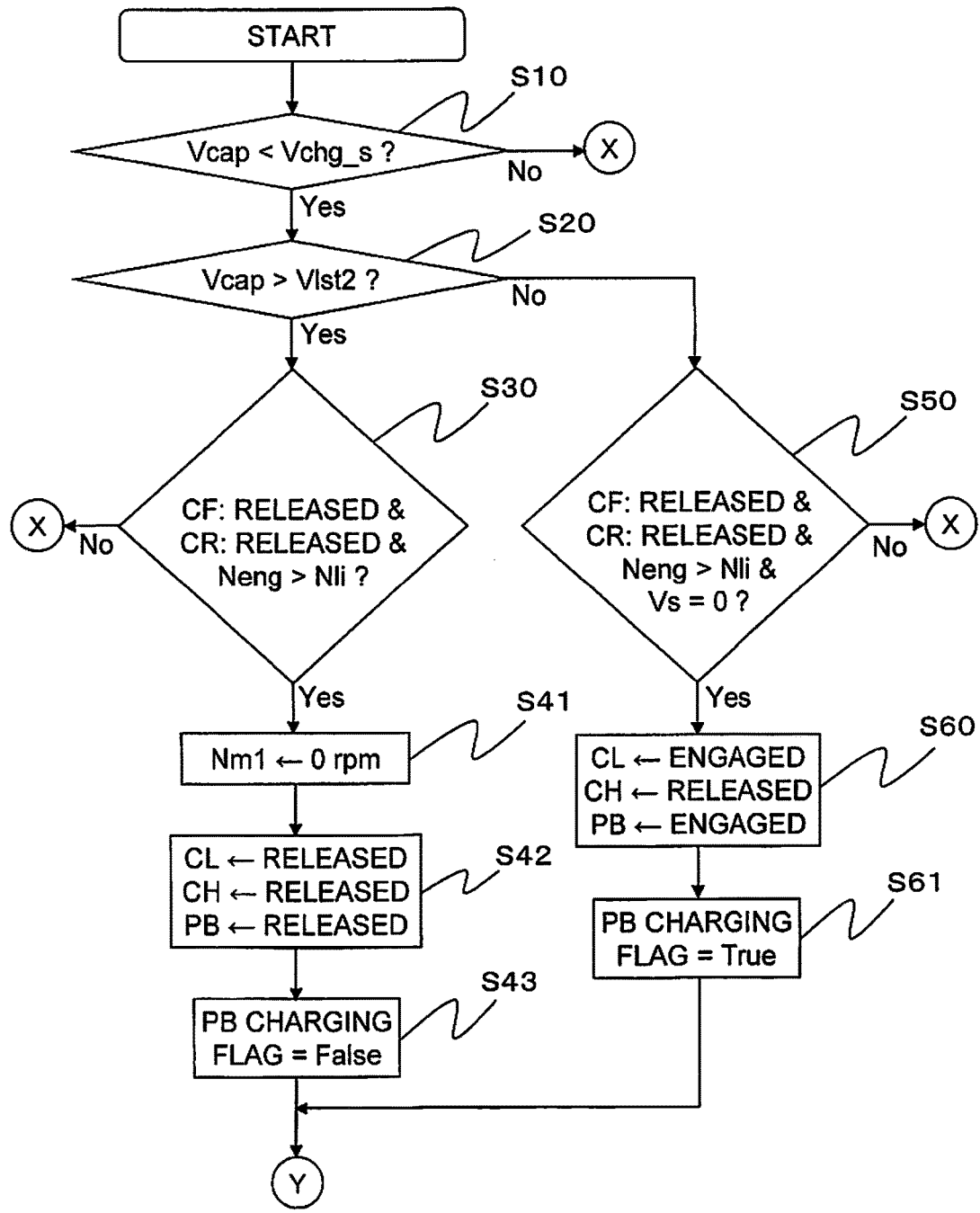
FIG. 5A is a flowchart outlining operations in the power transmission device according to the first exemplary embodiment.
Figure 5B:
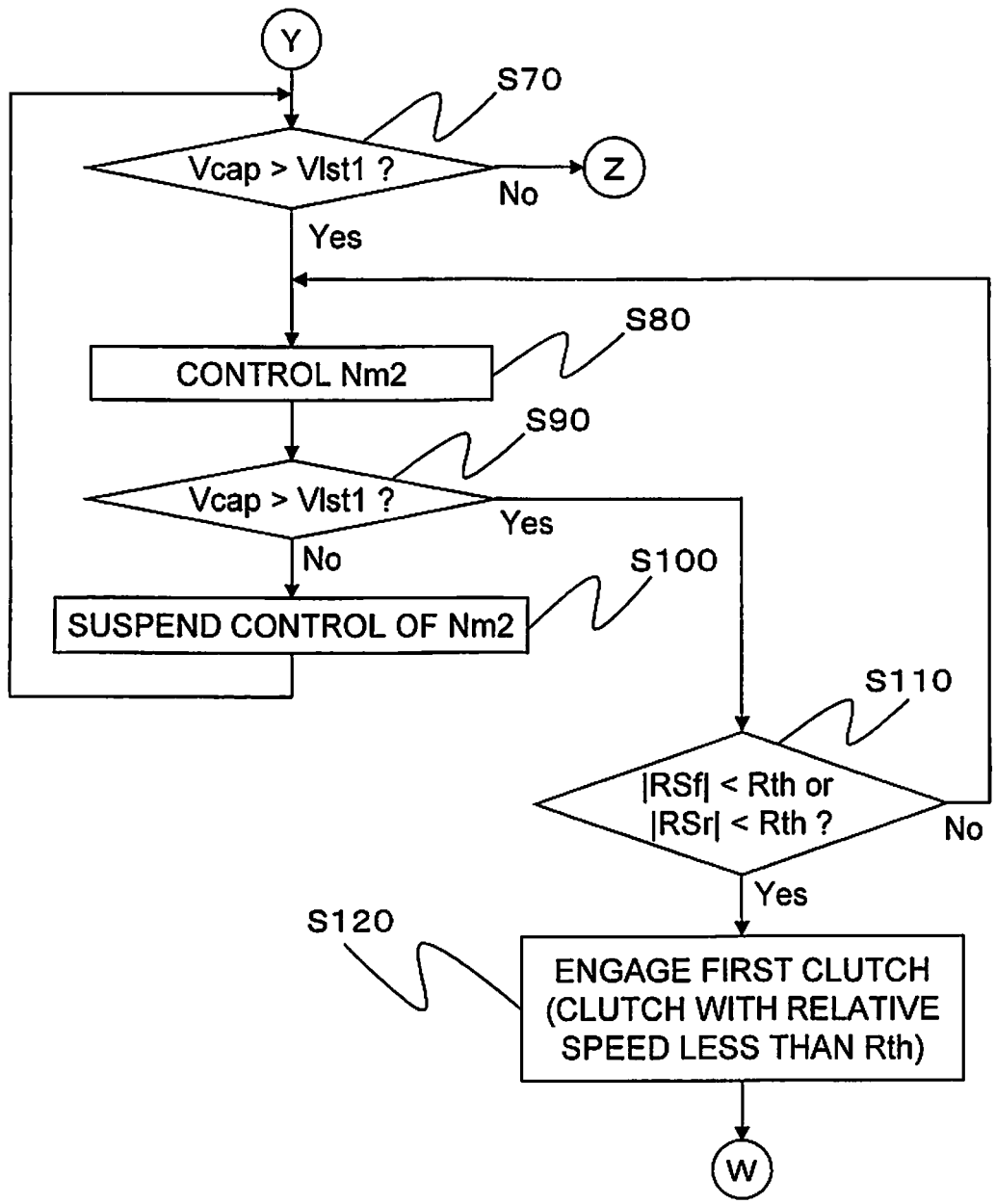
FIG. 5B is a flowchart outlining operations in the power transmission device according to the first exemplary embodiment.
Figure 5C:
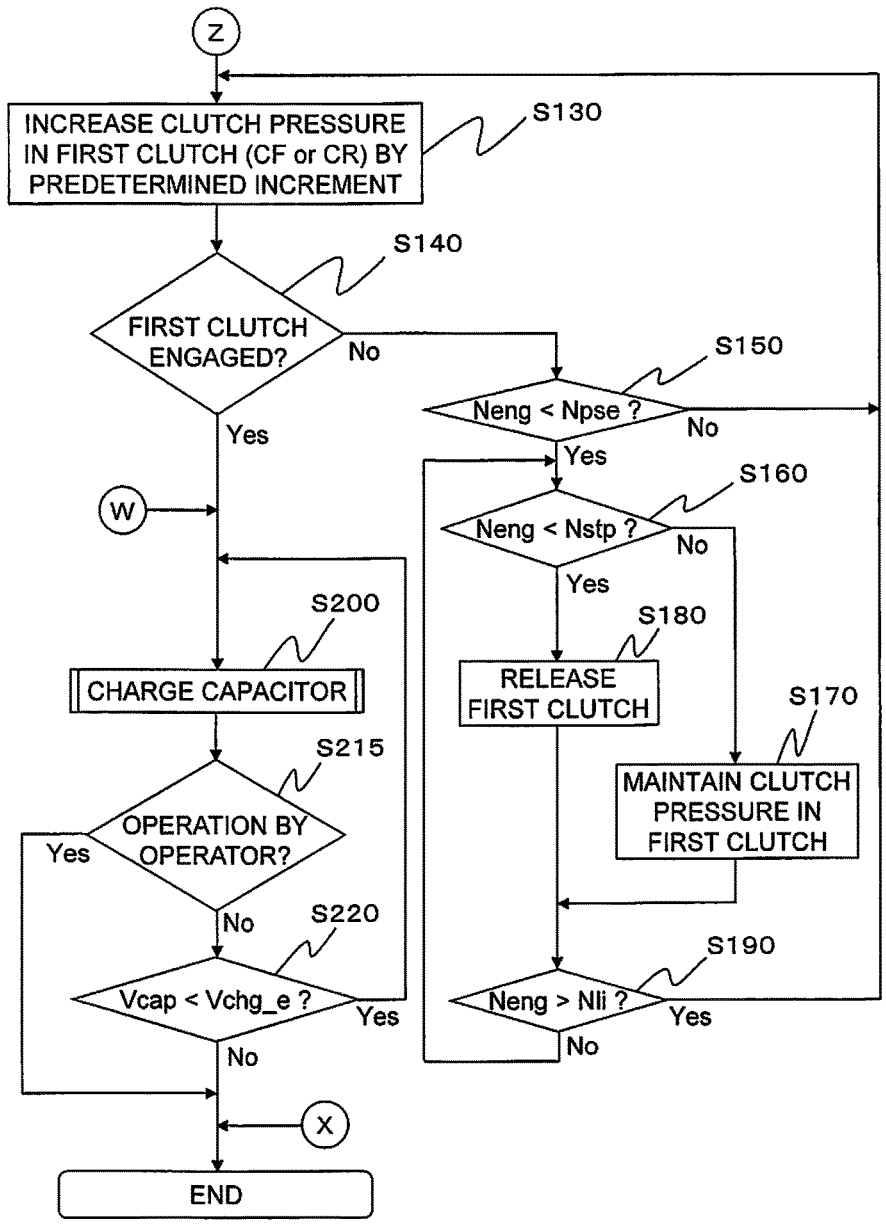
FIG. 5C is a flowchart outlining operations in the power transmission device according to the first exemplary embodiment.

In the first exemplary embodiment, the controller 27 locks the first carrier C1 in the first planetary gear mechanism 68, and adjusts the motors MG1, MG2 so that the rotation speed of the engine 21 and the power transmission shaft 67 converge. The difference in speed with an engaged rotation shaft can thereby be reduced. The controller 27 may then cause a first clutch to engage once the speeds of the two rotation shafts match, so that the second motor MG2 rotates due to drive power from the engine 21 to thereby charge the capacitor 64. That is, the controller 27 stores energy in the energy storage unit. An outline of the operations of the power transmission device 24 according to the first exemplary embodiment is described below using FIGS. 5A through 5C. FIGS. 5A through 5C are flowcharts outlining operations in the power transmission device 24 according to the first exemplary embodiment. A method of charging by engaging the parking brake PB is described after step S60 in FIGS. 5A through 5C. A method of charging by controlling the motor speed to synchronize the clutches is described after step S70 in FIGS. 5A through 5C. A method of charging by using the engine rotation to modulate and thereby engage the clutches is described after step S130. Finally, the operations of the power transmission device 24 presented below are executed when the work vehicle 1 starts, or when the FR operation device 54 is set to the neutral position (N).

In step S10, the controller 27 determines whether or not the voltage Vcap in the capacitor 64 is lower than a charging start threshold Vchg_s. When the capacitor voltage Vcap is greater than or equal to the charging start threshold Vchg_s (No at step S10), the controller 27 ends the control loop (FIG. 5A and FIG. 5C). When the capacitor voltage Vcap is less than the charging start threshold Vchg_s (Yes at step S10), the controller 27 determines whether or not the capacitor voltage Vcap is higher than a carrier rotation control threshold Vlst2 (step S20). When the capacitor voltage Vcap is less than or equal to the carrier rotation control threshold Vlst2, this signifies that the capacitor 64 does not hold sufficient charge to controls the first motor MG1 and to lock the first carrier C1.

When the capacitor voltage Vcap is greater than the carrier rotation control threshold Vlst2 (Yes at step S20), the controller 27 releases both the F-clutch CF and the R-clutch CR, and determines whether or not the engine speed Neng is greater than a predetermined speed Nli. The speed is a value close to the speed of the engine 21 when the accelerator is unpressed, and there is no load. When either the F-clutch CF or the R-clutch CR is connected, or, when the engine speed Neng is less than or equal to the predetermined speed Nli (No at step S30), the controller 27 ends the control loop (FIG. 5A and FIG. 5C). When both the F-clutch CF and the R-clutch CR are released, and the engine speed Neng is greater than the predetermined speed Nli (Yes at step S30), the controller 27 (motor control unit 55) controls the first motor MG1 so that the speed of the first motor MG1 is set to 0 rpm (step S41). In other words, the motor control unit 55 provides the inverter 60 with a command signal for setting the speed of the first motor MG1 to 0 rpm. The motor control unit 55 controls the first motor MG1 so that the speed Nm1 of the first motor MG1 (connected motor) is set to 0 rpm. That is, the controller 27 executes control to lock the controlling rotation element (in this case, the rotation shaft of the first motor MG1) connected to the second rotation element (first carrier C1) to thereby lock the second rotation element in the first planetary gear mechanism 68. In other words, the locking means locks the second rotation element in the first planetary gear mechanism 68.

Subsequently, the controller 27 (clutch control unit 58) controls the H-clutch control valve VH and the L-clutch CL control valve VL so that both the H-clutch CH and the L-clutch CL are released in step S42. That is, the clutch control unit 58 outputs a command signal to the H-clutch control valve VH and the L-clutch CL control valve VL to release the H-clutch CH and the L-clutch CL. In other words, the controller 27 (clutch control unit 58) causes the rotation-element locking means (the H-clutch CH and the L-clutch CL) to remove the limit on the movement of the fifth rotation element in the second planetary gear mechanism 69. Moreover, in step S42 the controller 27 (braking control unit 59) controls the parking brake control valve VB so that the parking brake PB is released (is disengaged). In other words, the braking control unit 59 outputs a command signal to the parking brake control valve VB to release the parking brake PB. Hereby, the output shaft 63 may rotate freely, and therefore the work vehicle 1 may operate in neutral in the same way a normal vehicle would operate. That is, when the operations in step S42 are carried out while the work vehicle 1 is traveling, the work vehicle 1 will travel due to inertia. Additionally, when the work vehicle 1 is positioned on an incline, the work vehicle 1 will accelerate towards the descent of the slope when the gravity component in a direction parallel to the slope is greater than the frictional forces inside the work vehicle such as the power transmission device 24.

After step S42 is complete, the controller 27 sets a PB Charging Flag to false (step S43). The PB Charging Flag is a Boolean variable, and a value of true signifies that charging can take place while the parking brake PB is engaged (later described, step S60).

Whereas, when the capacitor voltage Vcap is less than or equal to the carrier rotation control threshold Vlst2 (No at step S20), the controller 27 further determines whether or not the vehicle speed Vs is zero in addition to the conditions in step S30. When the conditions in step S50 are not met (No at step S50), the controller 27 ends the control loop (FIG. 5A and FIG. 5C). On the other hand when the condition in step S50 is met (Yes at step S50), in step S60 the controller 27 (i.e., the clutch control unit 58) controls the L-clutch control valve VL and the H-clutch control valve VH so that the L-clutch CL is engaged and the H-clutch CH is released. That is, the clutch control unit 58 outputs a command signal to the L-clutch control valve VL to engage the L-clutch CL, and outputs a command signal to the H-clutch control valve VH to release the H-clutch CH. Moreover, in step S60 the controller 27 (i.e., the braking control unit 59) controls the parking brake control valve VB so that the parking brake PB is engaged (in park). In other words, the braking control unit 59 outputs a command signal to the parking brake control valve VB to engage the parking brake PB. Hereby, the controller 27 locks the first carrier C1 in the first planetary gear mechanism 68. In other words, the locking means locks the second rotation element in the first planetary gear mechanism 68. In this case the work vehicle 1 stops because the parking brake PB stops the output shaft 63. After step S60 is complete, the controller 27 sets a PB Charging Flag to false (step S61).

When step S43 or step S61 is complete, the controller 27 determines in step S70 (FIG. 5B) whether or not the capacitor voltage Vcap is greater than a clutch synchronization control threshold Vlst1. When the capacitor voltage Vcap is less than or equal to the clutch synchronization control threshold Vlst1, this signifies that the capacitor 64 does not contain sufficient power for the controller to control the second motor MG2 and synchronize the input shaft and the output shaft of the F-clutch CF or the R-clutch CR. When the capacitor voltage Vcap is less than or equal to the clutch synchronization control threshold Vlst1 (No at step S70), the control loop proceeds to the later-described step S130. However when the capacitor voltage Vcap is greater than the clutch synchronization control threshold Vlst1 (Yes at step S70), the controller 27 (i.e., the speed adjustment unit/motor control unit 55) controls the speed (Nm2) of the second motor MG2 so that the speed of the output shafts 61f, 61r relative to the speed of the input shaft 61 of the F-clutch CF or the R-clutch CR (i.e., the relative speed of the F-clutch CF or the R-clutch CR) approaches zero (step S80). That is, the controller 27 (motor control unit 55) controls the second motor MG2 so that the speed of the output shafts 61s, 61r of the F-clutch CF or the R-clutch CR matches the speed of the input shaft 61 of the F-clutch CF or that R-clutch CR.

Next, while controlling the second motor MG2, the controller 27 determines whether or not the capacitor voltage Vcap is greater than the clutch synchronization control threshold Vlst1 (step S90). When the capacitor voltage Vcap is less than or equal to the clutch synchronization control threshold Vlst1 (No at step S90), the controller 27 suspends controlling the speed Nm2 of the second motor MG2 (step S100) and returns to step S70. When the capacitor voltage Vcap is greater than the clutch synchronization control threshold Vlst1 (Yes at step S90), the controller 27 determines whether or not the absolute value of the relative speed RSf of the F-clutch CF is below a predetermined threshold Rth (where Rth is a positive value), or whether or not the absolute value of the relative speed RSr of the R-clutch CR is below the predetermined threshold Rth (step S110). Note that the controller 27 may simply evaluate −Rth<RSf<Rth or −Rth<RSr<Rth in step S110.

The control loop proceeds to step S80 when the absolute values of both the relative speed RSf of the F-clutch CF and the relative speed RSr of the R-clutch CR are greater than or equal to the predetermined threshold Rth (No at step S110). When at least one of the absolute values of the relative speed RSf of the F-clutch CF and the relative speed RSr of the R-clutch CR is less than the predetermined threshold Rth (Yes at step 110), the controller 27 (i.e., the clutch control unit 58) controls the clutch control valve for a first clutch which has a relative speed less than Rth, to thereby slip and then engage the first clutch (step S120). That is, the clutch control unit 58 outputs a command signal to the clutch control valve for the first clutch that engages the first clutch so that the first clutch does not slip. That is, the clutch control unit 58 (speed adjustment unit) converges the speeds of the two rotation shafts in the first clutch to cause the first clutch to engage. Hereby, the wear on the first clutch may be reduced because the differences in speeds in the first clutch are reduced before engaging the first clutch. At this point the clutch pressure in the first clutch is referred to as the engagement pressure.

Whereas, when the capacitor voltage Vcap is less than or equal to the clutch synchronization control threshold Vlst1 (No at step S70), the controller 27 (clutch control unit 58) control is the clutch control valve for the first clutch so that the clutch pressure in the first clutch increases by a predetermined increment (Step S130). That is, the clutch control unit 58 outputs a command signal to the clutch control valve for the first clutch that increases the clutch pressure in the first clutch by a predetermined increment. The controller 27 (clutch control unit 58) increases the clutch pressure to thereby connect the two rotation shafts in the first clutch while the rotation shafts slip. Hereby, the controller 27 (clutch control unit 58) causes the speeds of the two rotation shafts in the first clutch to converge. The controller 27 (clutch control unit 58) then determines whether or not the first clutch is engaged (step S140). More specifically, the controller 27 (clutch control unit 58) determines whether or not the clutch pressure in the first clutch has reached the engagement pressure. The clutch control unit 58 may determine whether or not the engagement pressure is reached by evaluating the size of the electrical current in the command signal output to the clutch control valve for the first clutch. The speeds of the two rotation shafts in the first clutch are the same when the first clutch is engaged. That is, after the speeds of the two rotation shafts in the first clutch are the same, the controller 27 (clutch control unit 58) connects the first clutch so that the first clutch does not slip.

When the clutch pressure in the first clutch has not reached the engagement pressure (No at step S140), the controller 27 determines whether or not the engine speed Neng is below a predetermined speed Npse (step S150). A speed less than the speed Npse is more likely to decrease to an engine speed Nstp (later described) when the clutch is engaged. The control loop returns to step S130 when the engine speed Neng is greater than or equal to the predetermined speed Npse (No at step S150). When the engine speed Neng is below the predetermined speed Npse (Yes at step S150), the controller 27 determines whether or not the engine speed Neng is below a predetermined speed Nstp (step S160). A speed less than the speed Nstp is more likely to decrease to a speed where the engine 21 stops (stalls).

When the engine speed Neng is greater than or equal to the predetermined speed Nstp (No at step S160), the controller 27 (clutch control unit 58) controls the clutch control valve for the first clutch to maintain the clutch pressure in the first clutch (step S170). That is, the clutch control unit 58 outputs a command signal to the clutch control valve for the first clutch that maintains the clutch pressure in the first clutch. When the engine speed Neng is below the predetermined speed Nstp (Yes at step S160), the controller 27 (clutch control unit 58) controls the clutch control valve for the first clutch to release the first clutch (step S180). That is, the clutch control unit 58 outputs a command signal to the clutch control valve for the first clutch that releases the first clutch.

After steps S170 and S180 are complete, the controller 27 determines whether or not the engine speed Neng exceeds the speed Nli (step S190). The control loop returns to step S130 when the engine speed Neng exceeds the speed Nli (Yes at step S190). The control loop returns to step S160 when the engine speed Neng is less than or equal to the speed Nli (No at step S190).

Figure 6:
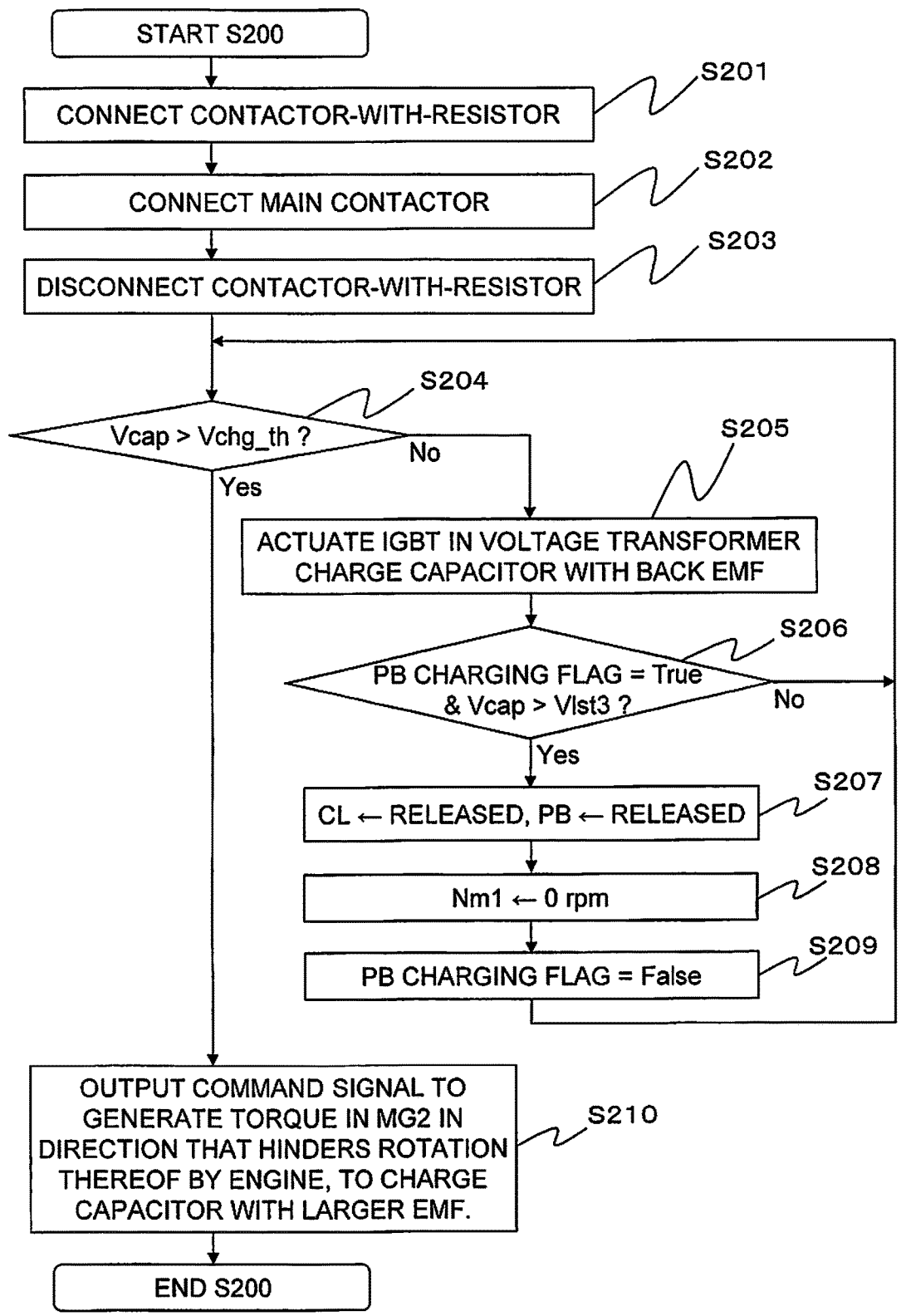
FIG. 6 is a flowchart detailing operations of the inverter when charging the capacitor.

When the first clutch is connected without slipping (after step S120, or, Yes at step S140), the controller 27 uses drive power from the engine 21 to cause the second motor MG2 to rotate to initiate the charging of the capacitor 64 (S200). FIG. 6 is a flowchart detailing operations of the inverter when charging the capacitor.

In this operation, first, the inverter 60 connects the contactor-with-resistor 89 on the basis of a command signal from the controller 27 (S201). However, there is a problem that a large amount of current may flow into the capacitor 64 if the main contactor 88 is suddenly connected after disconnecting the contactors 88, 89 creates a potential difference at branch points A, B. Accordingly, the inverter 60 connects the contactor-with-resistor 89 to reduce the amount of current flowing to the capacitor 64.

Once the potential difference at the branch points A and B disappears due to connecting the contactor-with-resistor 89, the inverter 60 connects the main contactor 88 (step S202), and disconnects the contactor-with-resistor 89 (step S203) on the basis of the command signal from the controller 27. The controller 27 then determines whether or not the capacitor voltage Vcap is greater than a predetermined voltage Vchg_th (step S204). The predetermined voltage Vchg_th is the voltage required by the inverter 60 for the inverter 60 to generate a drive signal used to generate a torque in the second motor MG2 in a direction that hinders rotation by the engine 21 during the later-described step S210.

When the capacitor voltage Vcap is less than or equal to the predetermined voltage Vchg_th (No at step S204), the inverter 60 actuates the IGBT in the transformer 86 on the basis of a command signal from the controller 27, and the second motor MG2 charges the capacitor 64 with the back EMF generated due to the second motor MG2 being rotated by the engine 21 (step S205). Next, the controller 27 determines whether or not the PB Charging Flag is true, and whether or not the capacitor voltage Vcap is greater than a predetermined voltage Vlst3 (step S206). When the PB Charging Flag is false, or the capacitor voltage Vcap is less than or equal to the predetermined voltage Vlst3 (No at step S206), the control loop returns to step S204. When the PB Charging Flag is true, and the capacitor voltage Vcap is greater than a predetermined voltage Vlst3 (Yes at step S206), the clutch control unit 58 outputs a command signal for releasing the L-clutch CL and the parking brake PB to the L-clutch control valve VL and the parking brake control valve VB (step S207). That is, the controller 27 (clutch control unit 58) causes the rotation-element locking means (the H-clutch CH and the L-clutch CL) to remove the limit on the movement of the fifth rotation element in the second planetary gear mechanism 69. Next, the motor control unit 55 provides the inverter 60 with a command signal for setting the speed of the first motor MG1 to 0 rpm in step S208. That is, the motor control unit 55 controls the first motor MG1 so that the speed Nm1 of the first motor MG1 (connected motor) is set to 0 rpm. More specifically, the controller 27 executes control to lock the controlling rotation element (in this case, the rotation shaft of the first motor MG1) connected to the second rotation element (first carrier C1) to thereby lock the second rotation element in the first planetary gear mechanism 68. Hereby, the work vehicle 1 may operate in neutral in the same way a normal vehicle would operate. After step S208 is complete, the controller 27 sets a PB Charging Flag to false (step S209).

After step S209 is complete, the control loop returns to step S204. When the capacitor voltage Vcap is greater than the predetermined voltage Vchg_th (Yes at step S204), in step S210 the controller 27 outputs a command signal to the inverter 60 (second internal inverter 84) for generating a torque in the second motor MG2 in a direction that hinders the rotation by the engine 21. That is, when the capacitor 64 is charging, the second motor MG2 is driven by the power stored in the capacitor 64 so that the second motor MG2 generates a torque in a direction that hinders the rotation thereof by the drive power from engine 21. Hereby, the back EMF output by the second motor MG2 increases. Therefore, in step S206, the inverter 60 actuates the IGBT in the transformer 86 and charge the capacitor 64 with a larger amount of back EMF.

Returning to FIG. 5C, the controller 27 determines whether or not the operator carried out a predetermined operation (step S215). A "predetermined operation" is, for instance, moving the FR control 54a from a neutral position (N) to another position (F, or R), or pressing on the accelerator control 51a. When a detection signal is entered from the FR switch detector 54b or the acceleration detector 51b, the controller 27 can thereby determine that the operator performed a predetermined operation. The controller 27 ends the control loop on determining that the operator performed a predetermined operation (Yes at step S215). On determining that the operator did not perform the predetermined operation (No at step S215), the controller 27 determines whether or not the voltage Vcap in the capacitor 64 is lower than a charging end threshold Vchg_e (step S220). When the voltage Vcap in the capacitor 64 is lower than a charging end threshold Vchg_e (No at step S220), the control loop returns to step S200. When the voltage Vcap in the capacitor 64 is greater than or equal to the charging end threshold Vchg_e (Yes at step S220), the controller 27 ends the control loop.

While charging the capacitor 64 as described above, the charging start threshold Vchg_s, the carrier rotation control threshold Vlst2, the speed threshold Nli, the clutch synchronization control threshold Vlst1, the relative speed threshold Rth, the speed threshold Npse, the speed threshold Nstp, the charging control threshold Vchg_th, and the charging end threshold Vchg_e are preliminarily determined and stored in the storage unit 56. Additionally, a relationship (Formula 1) is established between Vlst1, Vlst2, Vlst3, Vchg_s, and Vchg_e. Another relationship (Formula 2) is established between Nli, Npse, and Nstp.

$$Vlst2<Vlst3<Vlst1<Vchg\_s<Vchg\_e \qquad \text{Formula 1}$$

$$Nstp<Npse<Nli \qquad \text{Formula 2}$$

Note that although the above-described example illustrates a case where Vlst3<Vchg_th, steps S206 though S209 may be executed after step S210 when using Vchg_th<Vlst3. The control loop will still return to step S204 in this case when the controller determines "No" in step S206. When Vlst3=Vchg_th, the controller 27 may determine only whether or not the PB Charging Flag is "True" in step S206.

In the above-described first exemplary embodiment, the controller 27 (the motor control unit 55) controls the first motor MG1 to set the speed of the first motor MG1 to 0 rpm in step S41, however, the controller 27 (motor control unit 55) may control the second motor MG2 to set the speed of the second motor MG2 to 0 rpm. In this case, the second motor MG2 is the connected motor. The controller 27 executes control to lock the controlling rotation element (in this case, the rotation shaft of the second motor MG2) connected to the second rotation element (first ring gear R1) to thereby lock the second rotation element in the first planetary gear mechanism 68. In step S80, the controller 27 (motor control unit 55) controls the speed Nm1 of the first motor MG1 so that the speed of the output shafts 61*f*, 61*r* in relation to the speed of the input shaft 61 of the F-clutch CF or the R-clutch CR (i.e., the relative speed of the F-clutch CF or the R-clutch CR) approaches zero. The controller further suspends control of the speed Nm1 of the first motor MG1 in step S100. Hereby, it is the first motor MG1 that generates the back EMF in steps S205 and S206. In the same way in this case, because the output shaft 63 can rotate freely even if the first ring gear R1 is locked due to the release of both the F-clutch CF and the R-clutch CR, charging can take place in the work vehicle 1 while the work vehicle operates in neutral in the same way a normal vehicle would operate.

Second Exemplary Embodiment

The first exemplary embodiment illustrated an example where switching between connecting and disconnecting the H-clutch CH and the L-clutch CL thereby allows switching the power transmission device 24 between an output split mode and a compound split mode. However, the present invention may also be adopted in an input split type power transmission device. The second exemplary embodiment provides an example of adopting the present invention in an input split type power transmission device. Given that a work vehicle according to the second embodiment has numerous similarities with a work vehicle according to the first exemplary embodiment, only the differences with the first exemplary embodiment are described in detail.

Figure 7:
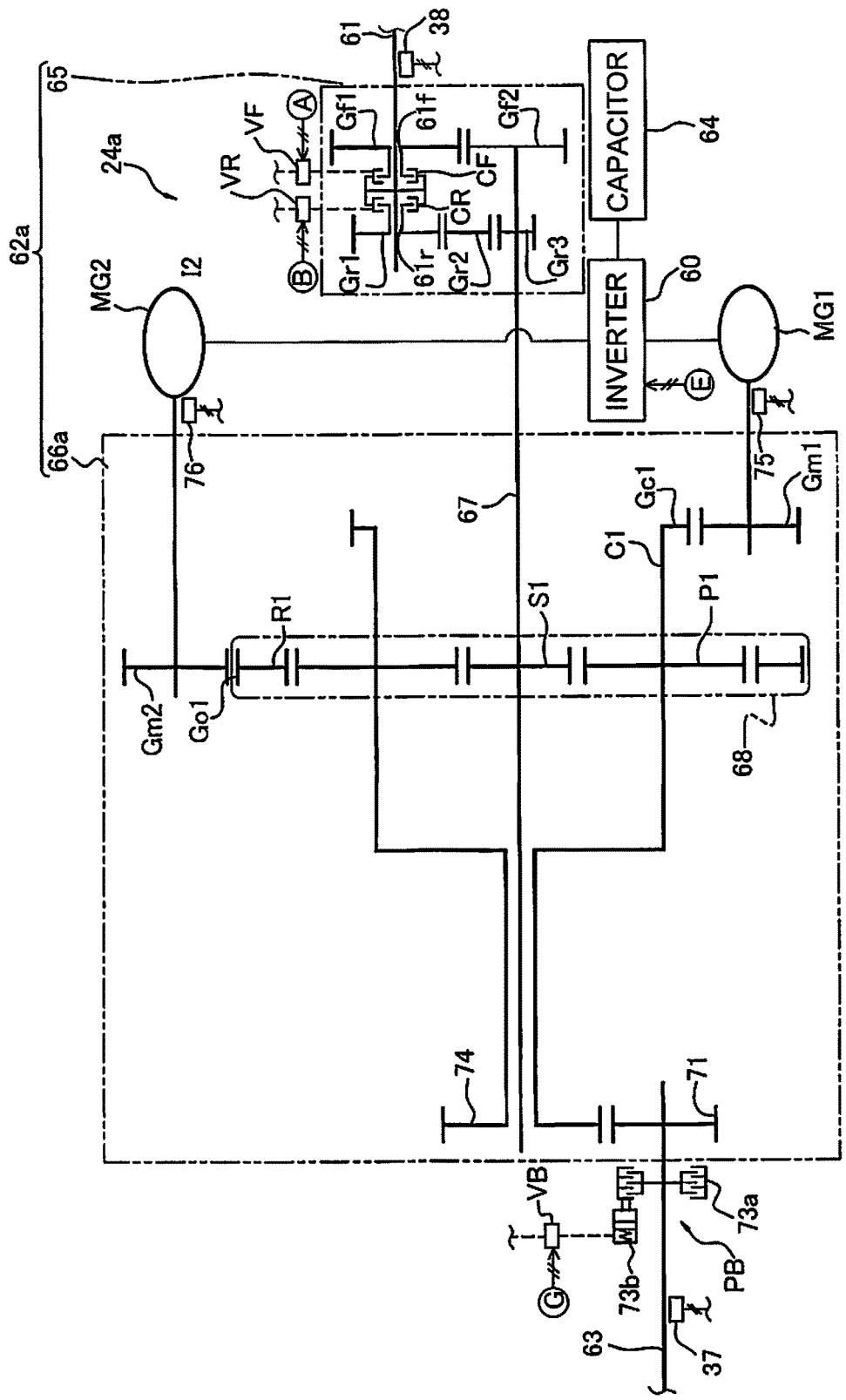
FIG. 7 is a schematic view illustrating a configuration of a power transmission device according to a second exemplary embodiment.

FIG. 7 is a schematic view illustrating a configuration of a power transmission device 24*a* according to a second exemplary embodiment. In FIG. 7 the components having the same functions as the components in FIG. 3 are given the same reference numerals. The gear shifting mechanism 66*a* in the gear mechanism 62*a* of the power transmission device 24*a* is different from the gear shifting mechanism 66 in the power transmission device 24. Compared to the gear shifting mechanism 66, the gear shifting mechanism 66*a* does not include a hi-lo switching mechanism 70, a second carrier C2, second planetary gears P2, a second ring gear R2, or a second outer ring gear Go2. The power transmission device 24*a* also includes an output gear 71 meshing with an outer gear 74, corresponding to the second sun gear S2, that is coupled with the first carrier C1.

The first carrier C1 and the output gear 71 are engaged in the power transmission device 24*a*. Therefore, when similarly to the first exemplary embodiment, the first carrier C1 is locked in order to charge the capacitor 64, the output shaft 63 is completely fixed. That is, the work vehicle 1 stops. Given this kind of feature of the power transmission device 24*a* according to the second exemplary embodiment, the operations of the power transmission device 24*a* to charge the capacitor 64 are slightly different from the operations in the first exemplary embodiment. The differences in operation are explained below in detail.

Figure 8:
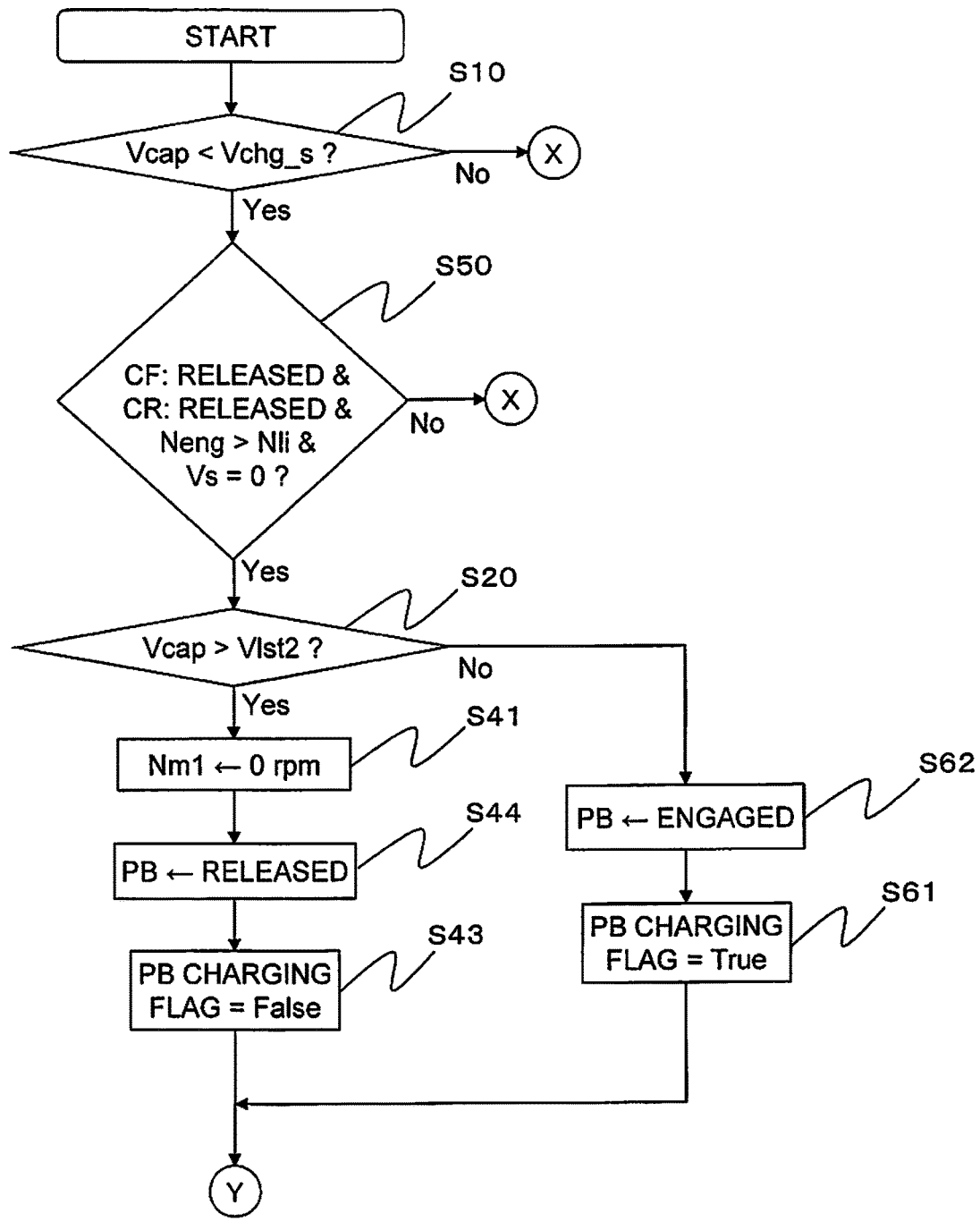
FIG. 8 is a flowchart outlining operations in the power transmission device according to a second exemplary embodiment.

FIG. 8 is a flowchart outlining operations in the power transmission device 24*a* according to the second exemplary embodiment. The operations after step S44 and step S62 are identical to those in the first exemplary embodiment, and thus a description thereof is omitted. Note that the operations in FIG. 8 given the same reference numerals as in FIG. 5 means that the operations are identical. Finally, the operations of the power transmission device 24 presented below are executed when the work vehicle 1 starts, or when the FR operation device 54 is set to the neutral position (N).

In step S10, the controller 27 determines whether or not the voltage Vcap in the capacitor 64 is lower than a charging start threshold Vchg_s. When the capacitor voltage Vcap is greater than or equal to the charging start threshold Vchg_s (No at step S10), the controller 27 ends the control loop (FIG. 8 and FIG. 5C). When the capacitor voltage Vcap is less than the charging start threshold Vchg_s (Yes at step S10), the controller 27 determines whether or not F-clutch CF and the R-clutch CR are both released, the engine speed Neng is greater than a predetermined speed Nli, and the vehicle speed Vs is zero (step S50). When the conditions in step S50 are not met (No at step S50), the controller 27 ends the control loop (FIG. 8 and FIG. 5C).

On the other hand, when the conditions in step S50 are met (Yes at step S50), the controller 27 determines whether or not the capacitor voltage Vcap is higher than a carrier rotation control threshold Vlst2 (step S20). When the capacitor voltage Vcap is higher than the carrier rotation control threshold Vlst2 (Yes at step S20), the controller 27 (motor control unit 55) controls the first motor MG1 so that the speed of the first motor MG1 is set to 0 rpm (step S41). In other words, the motor control unit 55 provides the inverter 60 with a command signal for setting the speed of the first motor MG1 to 0 rpm. That is, the motor control unit 55 controls the first motor MG1 so that the speed Nm1 of the first motor MG1 (connected motor) is set to 0 rpm. More specifically, the controller 27 executes control to lock the controlling rotation element (the rotation shaft of the first motor MG1) connected to the second rotation element (first carrier C1) to thereby lock the second rotation element in the first planetary gear mechanism 68. In other words, the locking means locks the second rotation element in the first planetary gear mechanism 68. In this case the work vehicle 1 stops because the output shaft 63 is stopped due to the first motor MG1. Next, in step S44 the controller 27 (braking control unit 59) controls the parking brake control valve VB so that the parking brake PB is released (is disengaged). In other words, the braking control unit 59 outputs a command signal to the parking brake control valve VB to release the parking brake PB.

In contrast, when the capacitor voltage Vcap is less than or equal to the carrier rotation control threshold Vlst2 (No at step S20), in step S62 the controller 27 (braking control unit 59) controls the parking brake control valve VB so that the parking brake PB is engaged (in park). In other words, the braking control unit 59 outputs a command signal to the parking brake control valve VB to engage the parking brake PB. Hereby, the controller 27 locks the first carrier C1 in the first planetary gear mechanism 68. In other words, the locking means locks the second rotation element in the first planetary gear mechanism 68. In this case the work vehicle 1 stops because the parking brake PB stops the output shaft 63.

A work vehicle 1 according to the exemplary embodiments of the present invention has the following features.

The controller 27 locks the first carrier C1 (second rotation element) in the first planetary gear mechanism 68, converges the speed of the two shafts in a first clutch which is one of the F-clutch CF and the R-clutch CR to cause the first clutch to engage, and causes the energy-generating motor, which is one of the first motor MG1 and the second motor MG2 to rotate using the drive power from the engine 21, to thereby charge the capacitor 64. Hereby, the capacitor 64 can charge even if the work vehicle is equipped with a power transmission device 24, 24*a* which connects the output shaft of the engine 21 and the rotation shaft of the energy-generating motor via a first planetary gear mechanism 68.

When the amount of electricity Vcap stored in the capacitor 64 is less than or equal to a first predetermined amount Vlst1, the controller 27 (clutch control unit 58, speed adjustment unit) slips the first clutch while engaging the first clutch thereby allowing the speeds of the two rotation shafts in the first clutch to converge. Hereby, the controller 27 is able to synchronize the two rotation shafts in the first clutch even with little electricity the stored in the capacitor 64.

The controller 27 is able to control the first motor MG1 or the second motor MG2 that is acting as the energy-generating motor so that the speed of the output shaft of the first clutch approaches the speed of the input shaft of the first clutch. Hereby, this reduces the wear on the clutch when connecting the first clutch. Accordingly, this reduces the frequency with which parts in the work vehicle need to be exchanged.

When the amount of electricity Vcap stored in the capacitor 64 is less than or equal to a second predetermined amount Vlst2, the controller 27 can engage the parking brake PB to thereby lock the first carrier C1 (second rotation element) in the first planetary gear mechanism 68. Fixing the first carrier C1 (second rotation element) allows transmission of the drive power from the engine 21 to one of the first motor MG1 and the second motor MG2 that is acting as the energy-generating motor. Therefore, the capacitor 64 can charge even if the work vehicle is equipped with a power transmission device 24, 24*a* which connects the output shaft of the engine 21 and the rotation shaft of the energy-generating motor via a first planetary gear mechanism 68.

The first motor MG1 (one of the locking means, and connected motor) is connected to the first carrier (second rotation element) in the first planetary gear mechanism 68. Further, where one of the first motor MG1 and the second motor MG2 is the connected motor, the controller 27 may control the connected motor so that the speed of the connected motor becomes zero, allowing the first carrier C1 (second rotation element) in the first planetary gear mechanism 68 to be locked. This allows transmission of the drive power from the engine 21 to one of the first motor MG1 and the second motor MG2 that is acting as the energy-generating motor. The capacitor 64 can therefore charge even if the work vehicle is equipped with a power transmission device 24, 24*a* which connects the output shaft of the engine 21 and the rotation shaft of the energy-generating motor via a first planetary gear mechanism 68. Finally, the first carrier C1 (second rotation element) can be locked without using the parking brake PB; therefore, the work vehicle 1 may operate in neutral in the same way a normal vehicle would operate.

The controller 27 drives the energy-generating motor which is one of the first motor MG1 and the second motor MG2 with the electricity being stored in the stored in the capacitor 64 in order to generate a torque in a direction that hinders the rotation thereof due to the drive power from the engine 21 when charging the capacitor 64, when the amount of electricity Vcap stored in the capacitor 64 is larger than a third predetermined amount Vchg_th. Hereby, the energy-generating motor output a larger back EMF to thereby reduce the charging time for the capacitor 64.

The capacitor 64 may be used as an energy storage unit. The capacitor discharges more quickly than a battery due to its larger internal resistance. A work vehicle 1 according to the exemplary embodiments of the present invention is capable of charging a capacitor 64 while stopped or in a state approaching neutral; therefore, it is possible to use a small-capacity capacitor as the drive source for the motors MG1, MG2.

Here ends the description of exemplary embodiments of the present invention; the present invention is not limited to these descriptions but may be modified in various ways and so far as the modifications do not deviate from the spirit of the present invention.

The present invention is not limited to the above described wheel loader, and may be adopted in another type of work vehicle, such as a bulldozer, a tractor, a forklift, or a motor grader.

The present invention is not limited to an EMT and may be adopted in another type of shifting device such as an HMT. In this case, the first motor MG1 functions as a hydraulic motor and a hydraulic pump. The second motor MG2 also functions as a hydraulic motor and a hydraulic pump. The first motor MG1 and the second motor MG2 are variable displacement pump-motors where the controller 27 controls the swashplate or the tilt angle of the tilt axis to control the capacity thereof. When the present invention is adopted in an HMT, an accumulator may be used as the energy storage unit in place of the capacitor 64.

While in the exemplary embodiments the F-clutch CF or the R-clutch CR is modulated and then engaged, the controller may first engage the F-clutch CF or the R-clutch CR, and then either control the motors MG1, MG2 so that the speed thereof is 0 rpm, or modulate and engage the L-clutch CL.

In the exemplary embodiments, the first through sixth rotation elements are assumed to be the first sun gear S1, the first carrier C1, the first ring gear R1, the second sun gear S2, the second carrier C2, and the second ring gear R2, respectively. However, so long as the first through third elements are mutually different rotation elements in the first planetary gear mechanism 68, any kind of combination is acceptable. In addition, so long as the fourth through sixth elements are mutually different rotation elements in the second planetary gear mechanism 69, any kind of combination is acceptable. Furthermore, the positional relationship between the first carrier C1 and the second carrier C2 in the first planetary gear mechanism 68 and the second planetary gear mechanism 69 may be reversed. Similarly, the terms "first motor MG1", and "second motor MG2" are each provided for differentiating the motors; the component referred to as the first motor MG1 in the exemplary embodiments may be referred to as the second motor MG2, and the component referred to as the second motor MG2 may be referred to as the first motor MG1.

In addition, in the first exemplary embodiment the parking brake PB and the H-clutch CH may be engaged, the L-clutch CL disconnected, and the engine 21 rotated so thereby at least one of the first motor MG1 and the second motor MG2 generates electricity.

While in step S41, the controller 27 executes control to set the speed of the connected motor to 0 rpm, the controlling rotation element may be locked using a different method. For instance, the connected motor may be provided with a brake, and the brake may lock the rotation shaft (controlling rotation element) in the connected motor. Alternatively, a clutch may be provided between the second rotation element and the connected motor with at least one rotation element in the clutch connected to a fixed end like the L-clutch CL; in this case the controller 27 engages the aforementioned clutch to thereby lock the controlling rotation element.

The controller 27 may carry out the operations in steps S201 through S203 before the step S140 or step S120. Additionally, the controller 27 may increase the speed of the engine 21 during operations in step S205 or step S210 (i.e., after engaging the first clutch). This reduces the charging time for the capacitor 64.

In the second exemplary embodiment, the controller 27 may omit the conditional branch at step S20, and at "Yes" in step S50 carry out the operations in step S60 in all cases. The operations in either step S41 or step S60 locks the output shaft 63, and therefore the work vehicle 1 stops.

In the above-described exemplary embodiments, the power transmission device exemplified is provided with one or two planetary gear mechanisms; however, the number of planetary gear mechanisms provided to the power transmission device may be three or more. The exemplary embodiments of the present invention provide a work vehicle capable of charging even for a work vehicle equipped with a power transmission device configured to connect the output shaft of an engine and the rotation shaft of a motor-generator via a planetary gear mechanism.

The invention claimed is:

1. A work vehicle comprising:
an engine;
a hydraulic pump driven by the engine;
a work implement driven by hydraulic fluid discharged from the hydraulic pump;
a travel apparatus driven by the engine;
a power transmission device including an input shaft, an output shaft, a gear mechanism, an energy-generating motor, a first clutch, and a locking device, the power transmission device being configured to transmit the drive power from the engine to the travel apparatus;
a controller configured to control the power transmission device; and
an energy storage unit configured to store the energy generated by the energy-generating motor,
the power transmission device being configured such that changing the speed of the energy-generating motor changes the speed ratio of the output shaft relative to the input shaft in the power transmission device;
the gear mechanism including a planetary gear mechanism, the gear mechanism being configured to transmit the rotations of the input shaft to the output shaft;
the planetary gear mechanism including a first rotation element, a second rotation element, and a third rotation element which are mutually different;
the first clutch being provided along the power transmission route between the engine and the first rotation element;
the locking device being configured to lock or release the second rotation element;
the energy-generating motor being connected to the third rotation element;
the controller including a speed adjustment unit configured to adjust the speed of two rotation shafts in the first clutch; and
the controller being configured to
lock the second rotation element using the locking device,
converge the speeds of the two rotation shafts in the first clutch using the speed adjustment unit to cause the first clutch to engage, and
cause the energy-generating motor to rotate using the drive power from the engine to thereby accumulate energy in the energy storage unit.

2. The work vehicle according to claim 1, wherein
the speed adjustment unit is configured to cause the first clutch to engage while slipping the first clutch to allow the speeds of the two rotation shafts in the first clutch to converge when the energy stored in the energy storage unit is less than or equal to a first predetermined amount.

3. The work vehicle according to claim 2, wherein
the locking device includes a parking brake configured to stop the output shaft; and
the controller is configured to actuate the parking brake thereby locking the second rotation element when the energy stored in the energy storage unit is less than or equal to a second predetermined amount.

4. The work vehicle according to claim 1, wherein
one of the rotation shafts of the first clutch is a clutch input shaft connected to the output shaft of the engine;
the other rotation shaft in the first clutch is a clutch output shaft connected to the output shaft of the energy-generating motor via the second rotation element in the planetary gear mechanism; and
the speed adjustment unit is configured to control the motor so that the speed of the clutch output shaft converges with the speed of the clutch input shaft when the energy stored in the energy storage unit is greater than a first predetermined amount.

5. The work vehicle according to claim 4, wherein
the locking device includes a connected motor that is connected to the second rotation element; and
the controller is configured to control the connected motor so that the speed of the connected motor becomes zero, thereby locking the second rotation element when the energy stored in the energy storage unit is greater than a second predetermined amount.

6. The work vehicle according to claim 5, wherein
the controller is configured to drive the energy-generating motor with the energy stored in the energy storage unit so that the energy-generating motor generates a torque in a direction that hinders rotation thereof due to the drive power from the engine when accumulating energy in the energy storage unit, when the energy stored in the energy storage unit is greater than a third predetermined amount.

7. The work vehicle according to claim 6, wherein the energy storage unit is a capacitor.

8. The work vehicle according to claim 7, wherein the controller is configured to increase the speed of the engine after the first clutch is engaged.

9. The work vehicle according to claim 4, wherein
the locking device includes a parking brake configured to stop the output shaft; and
the controller is configured to actuate the parking brake thereby locking the second rotation element when the energy stored in the energy storage unit is less than or equal to a second predetermined amount.

10. The work vehicle according to claim 1, wherein the controller is configured to drive the energy-generating motor with the energy stored in the energy storage unit so that the energy-generating motor generates a torque in a direction that hinders rotation thereof due to the drive power from the engine when accumulating energy in the energy storage unit, when the energy stored in the energy storage unit is greater than a third predetermined amount.

11. The work vehicle according to claim 1, wherein the energy storage unit is a capacitor.

12. The work vehicle according to claim 11, wherein the controller is configured to increase the speed of the engine after the first clutch is engaged.

13. A method of controlling a work vehicle,
the work vehicle being equipped with an engine, a hydraulic pump driven by the engine, a work implement driven by hydraulic fluid discharged from the hydraulic pump, a travel apparatus driven by the engine, a power transmission device including an input shaft, an output shaft, a gear mechanism, an energy-generating motor, a first clutch, and a locking means device, the power transmission device being configured to transmit the drive power from the engine to the travel apparatus, and an energy storage unit configured to store energy generated by the energy-generating motor;
the power transmission device being configured such that changing the speed of the energy-generating motor changes the speed ratio of the output shaft relative to the input shaft in the power transmission device;
the gear mechanism including a planetary gear mechanism, the gear mechanism being configured to transmit the rotations of the input shaft to the output shaft;
the planetary gear mechanism including a first rotation element, a second rotation element, and a third rotation element which are mutually different;
the first clutch being provided on the power transmission route between the engine and the first rotation element;
the locking device being configured to lock or release the second rotation element;
the energy-generating motor being connected to the third rotation element;
the method comprising steps of
locking or releasing the second rotation element using the locking device;
converging the speeds of the two rotation shafts in the first clutch to cause the first clutch to engage; and
causing the energy-generating motor to rotate using the drive power from the engine to thereby accumulate energy in the energy storage unit.

* * * * *